United States Patent
Kobayashi et al.

(10) Patent No.: US 9,938,426 B2
(45) Date of Patent: Apr. 10, 2018

(54) HARD COATING COMPOSITION AND COMPOSITION FOR FORMING A HIGH REFRACTIVE INDEX ANTIBLOCKING LAYER

(71) Applicants: NIPPON BEE CHEMICAL CO., LTD., Osaka (JP); Teijin Limited, Osaka (JP)

(72) Inventors: Kazuhito Kobayashi, Osaka (JP); Yusuke Nakata, Osaka (JP); Koichi Imamura, Tokyo (JP); Ryuhei Kanzaki, Tokyo (JP); Yohei Okada, Tokyo (JP)

(73) Assignees: TEIJIN LIMITED, Osaka (JP); NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 772 days.

(21) Appl. No.: 14/388,927

(22) PCT Filed: Mar. 19, 2013

(86) PCT No.: PCT/JP2013/057891
§ 371 (c)(1),
(2) Date: Sep. 29, 2014

(87) PCT Pub. No.: WO2013/146482
PCT Pub. Date: Oct. 3, 2013

(65) Prior Publication Data
US 2015/0049261 A1    Feb. 19, 2015

(30) Foreign Application Priority Data

Mar. 30, 2012 (JP) ................. 2012-079755
Mar. 30, 2012 (JP) ................. 2012-079756
Mar. 30, 2012 (JP) ................. 2012-079768

(51) Int. Cl.
B32B 27/36 (2006.01)
C09D 147/00 (2006.01)
(Continued)

(52) U.S. Cl.
CPC ............ *C09D 147/00* (2013.01); *B32B 27/36* (2013.01); *C08G 8/30* (2013.01); *C08G 8/36* (2013.01);
(Continued)

(58) Field of Classification Search
CPC . C08G 8/00; C08G 8/28; C08G 10/00; C08G 16/00; B32B 27/36
See application file for complete search history.

(56) References Cited

U.S. PATENT DOCUMENTS 9,639,227 B2 * 5/2017 Kobayashi ............ B32B 27/36
2006/0251848 A1 * 11/2006 Armstrong ........... G11B 7/2542
428/64.4
(Continued)

FOREIGN PATENT DOCUMENTS

CN    1053687    8/1991
EP    0 433 081   6/1991
(Continued)

OTHER PUBLICATIONS

Chattopadhyay et al, Thermal and mechanical properties of epoxyacrylate/methacrylates UV cured coatings, Progress in Organic Coatings 54 (2005) 10-19.*
(Continued)

*Primary Examiner* — Holly Le
(74) *Attorney, Agent, or Firm* — Wenderoth, Lind & Ponack, L.L.P.

(57) ABSTRACT

To provide a hard coating composition which forms a hard coat layer that has high visibility and good hardness, while having stretchability. To provide a technique which is
(Continued)

capable of effectively preventing blocking phenomenon in a layered product such as a resin film without adversely affecting the visibility. The present invention provides a hard coating composition which contains (A) a phenolic novolac acrylate that has two or more acrylate groups and (B) an aromatic group-containing mono or poly(meth)acrylate compound that contains 1-2 mol of an alkylene oxide structure having two or three carbon atoms in each molecule. This hard coating composition contains 60-85 parts by mass of the phenolic novolac acrylate (A) and 15-30 parts by mass of the (meth)acrylate (B) per 100 parts by mass of the resin component contained in the hard coating composition.

27 Claims, 2 Drawing Sheets

(51) Int. Cl.
    *C09D 4/00*     (2006.01)
    *C08G 8/30*     (2006.01)
    *C08G 8/36*     (2006.01)
    *C09D 161/14*     (2006.01)
    *G02F 1/1333*     (2006.01)

(52) U.S. Cl.
    CPC .............. *C09D 4/00* (2013.01); *C09D 161/14* (2013.01); *G02F 1/13338* (2013.01); *Y10T 428/24355* (2015.01); *Y10T 428/265* (2015.01); *Y10T 428/266* (2015.01); *Y10T 428/31935* (2015.04)

(56) References Cited

U.S. PATENT DOCUMENTS

2010/0113678 A1*   5/2010   Suzuki .................... C08L 61/06
    524/541
2014/0228468 A1*   8/2014   Takashima ........... C08G 18/672
    522/63

FOREIGN PATENT DOCUMENTS

| | | |
|---|---|---|
| JP | 04-093367 | 3/1992 |
| JP | 2002-241527 | 8/2002 |
| JP | 2003-055607 | 2/2003 |
| JP | 2007-292883 | 11/2007 |
| JP | 2008-239673 | 10/2008 |
| JP | 2009-265590 | 11/2009 |
| JP | 2010-111876 | 5/2010 |
| JP | 2010-191370 | 9/2010 |

OTHER PUBLICATIONS

International Preliminary Report on Patentability dated Oct. 1, 2014 in International (PCT) Application No. PCT/JP2013/057891.
International Search Report dated Jun. 25, 2013 in International (PCT) Application No. PCT/JP2013/057891.

* cited by examiner

HARD COATING COMPOSITION AND COMPOSITION FOR FORMING A HIGH REFRACTIVE INDEX ANTIBLOCKING LAYER

TECHNICAL FIELD

The present invention relates to a hard coating composition which provides a hard coat layer having stretchability, as well as high visibility and excellent hardness. The present invention also relates to a composition for forming a high refractive index antiblocking layer, an antiblocking film obtainable by applying the composition for forming a high refractive index antiblocking layer, and a transparent electroconductive laminate comprising a transparent electrically conducting layer formed on at least one surface of the antiblocking film.

BACKGROUND OF THE INVENTION

A liquid crystal display device has advantages such as thinness, lightweight, low power consumption and so on, and is widely used in various technical fields such as computers, word processors, television sets, mobile phones, handheld terminal devices and so on. In addition, so-called touch panels of such liquid crystal display devices having a mechanics of manipulation by touch on their screen are spreading rapidly. The touch panels are widely used in mobile phones like smart phones, tablet computers, handheld terminal devices, automated teller machines, automatic vending machines, personal digital assistances, copying machines, facsimiles, game machines, guiding devices set up in facilities such as museums and department stores, car navigation systems, multifunctional terminals set up in convenience stores or monitoring devices of railroad vehicles.

The touch panel generally has a transparent electroconductive laminate comprising a transparent substrate on which a transparent electrically conductive layer is formed. Indium tin oxide is generally used to form a transparent electroconductive layer.

A PET film or a polycarbonate film is commonly used as a substrate film of a transparent electroconductive laminate thanks to its high transparency and reasonable prices. A transparent hard coat layer can be preferably applied onto such a substrate film with a view to improving scratch resistance and durability. On the other hand, the application of a transparent hard coat layer onto a substrate causes a problem of the appearance of interference fringes. The appearance of interference fringes deteriorates visibility.

The appearance of interference fringes is due to a difference of refractive indexes between a transparent substrate firm and a transparent hard coat layer, and quite minute variation of the thickness of the transparent hard coat layer. The appearance of interference fringes can notionally be vanished by through suppression of variation of the thickness. However such a measure is unrealistic in current technologies and is extremely difficult in practice.

Other means to prevent the appearance of interference fringes include a means to minimize a refractive index difference between a transparent substrate firm and a transparent hard coat layer. For example, JP 2009-265590 A (Patent Document 1) discloses that the addition of a high refractive index metal oxide like zirconia, titanium dioxide, indium tin oxide (ITO), antimony tin oxide (ATO), zinc oxide (ZnO), tin oxide and zinc antimonate as a high refractive index material into a transparent hard coat layer can control a refractive index of the transparent hard coat layer. However, the addition of a high refractive index material such as the metal oxide into a transparent hard coat layer may deteriorate stretchability and flex resistance of the hard coat layer.

JP 2002-241527 A (Patent Document 2) describes a film having a transparent hard coat layer with excellent visibility. Patent Document 2 further describes a high refractive index layer. In Patent Document 2, a high refractive index layer is formed by vapor deposition or sputtering of a metal oxide such as ZnO, $TiO_2$, $CeO_2$, $SnO_2$, $ZrO_2$, ITO, or by dispersing fine particles of the metal oxide in a binder resin (paragraph 0007 and so on).

JP 2003-055607 A (Patent Document 3) describes a coating material causing less visible interference fringes on a transparent substrate. The coating material has a controlled attenuation factor due to compounding of fine particles and/or a pigment. The fine particles include those of various metals, metal oxides, metal nitrides and metal carbides. The pigment includes an azo pigment, a phthalocyanine pigment, an anthraquinone pigment, a quinacridone pigment, a dioxane pigment, a quinacridone pigment (paragraph 0021 and so on).

Patent Documents 1-3 describe a means of the prevention of appearance of interference fringes and the improvement of visibility. However, Patent Documents 1-3 disclose the technical features different from those of the present invention in that Patent Documents 1-3 use the high refractive index materials such as metal oxides.

JP 2007-292883 A (Patent Document 4) describes an optical laminate having a high refractive index hard coat layer containing a bromoresin (claim 1 and so on). Patent Document 4 discloses that the optical laminate has improved optical properties, light stability and hardness. The present invention has different technical features from the Patent Document 4 in that the present invention uses no bromoresin to increase the refractive index of the hard coat layer.

JP 2008-239673 A (Patent Document 5) describes a transparent crosslinked film which is obtained by curing and crosslinking a composition comprising a vinyl ester composition, a polyfunctional acrylate and a (meth)acrylate having a fluorene backbone (claim 1). The transparent crosslinked film is characterized in that it has excellent surface hardness and no interference fringe. In Patent Document 5, experimental tests were performed under a condition of a film thickness of 50 μm. However, such a film thickness is an extremely large thickness compared to a film thickness commonly used in the field of hard coat layers. Such an extremely large film thickness provides disadvantages in a cost. A suppression effect of interference fringes obtained with the composition taught by Patent Document 5 does not reach a level required in the technical field at present.

PRIOR ART DOCUMENTS

Patent Documents

Patent Document 1: JP 2009-265590 A
Patent Document 2: JP 2002-241527 A
Patent Document 3: JP 2003-055607 A
Patent Document 4: JP 2007-292883 A
Patent Document 5: JP 2008-239673 A

SUMMARY OF THE INVENTION

Problems to be Resolved by the Invention

The present invention has an object to resolve the above problems in the conventional technology. In details, the present invention has an object to provide a hard coating composition which provides a hard coat layer having stretchability, as well as high visibility and excellent hardness.

The present invention also has an object to provide a technology for effectively preventing disadvantage of interlaminar blocking between laminar materials such as a resin film, i.e., blocking phenomenon.

Means of Solving the Problems

The present invention provides a hard coating composition comprising;

(A) a phenolic novolac acrylate having two or more acrylate groups, and (B) an aromatic group-containing mono or poly(meth)acrylate having 1 or 2 mols of an alkylene oxide structure with two or three carbon atoms in each molecule, wherein the hard coating composition comprises 60 to 85 parts by mass of the phenolic novolac acrylate (A) and 15 to 30 parts by mass of the (meth)acrylate (B), providing that 100 parts by mass of 4 resin content in the hard coating composition.

In the hard coating composition, the phenolic novolac acrylate (A) may preferably be represented by the following formula (I):

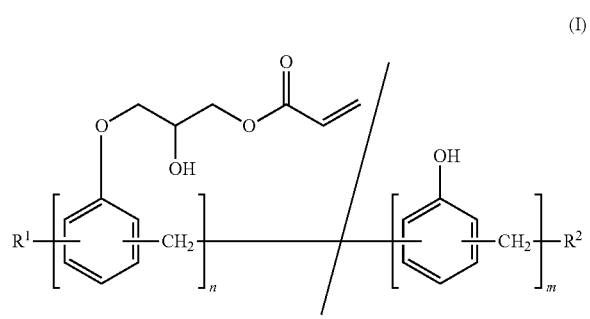

wherein $R^1$ represents H or $CH_2OH$, $R^2$ represents H or OH, n represents a number of 2 to 5 and m represents a number of 0 to 5.

In the hard coating composition, the (meth)acrylate (B) may preferably be an aromatic group-containing (meth)acrylate having a refractive index within a range of 1.56 to 1.64.

The hard coating composition may preferably further comprises (C) a fluorene unit-containing (meth)acrylate having two or more (meth)acrylate groups, wherein the hard coating composition comprises 40 to 70 parts by mass of the phenolic novolac acrylate (A), 10 to 30 parts by mass of the (meth)acrylate (B) and 15 to 40 parts by mass of the fluorene unit-containing (meth)acrylate (C), providing that 100 parts by mass of a resin content in the hard coating composition.

In the hard coating composition, the fluorene unit-containing (meth)acrylate (C) may preferably be represented by the following formula (II):

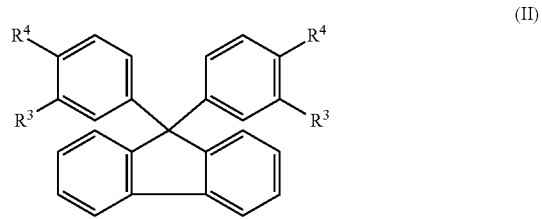

wherein each of $R^3$ independently represents H or $CH_3$, $R^4$ represents -A-OC(O)CR=$CH_2$, wherein A each represents —$OCH_2CH_2$—, —$OCH_2CH_2CH_2$—, —$OCH(CH_3)$ $CH_2$— or —$OCH_2CH(CH_3)$— and R each represents H or $CH_3$.

In the hard coating composition, a total content of ZnO, $TiO_2$, $CeO_2$, $SnO_2$, $ZrO_2$ and indium tin oxide in the hard coating composition may preferably be less than or equal to 0.0001% by mass.

The present invention also provides a hard coat film having a transparent polymer substrate and a hard coat layer which is obtainable by applying the hard coating composition, wherein
the hard coat layer has a refractive index within a range of 1.565 to 1.620.

In the hard coat film, the hard coat layer may preferably have a thickness within a range of 0.05 to 10 μm.

In the hard coat film, the substrate may preferably be a PET film having a thickness within a range of 20 to 300 μm, and the hard coat film has a characteristic that the hard coat layer has no crack in case that the hard coat film is elongated by 15% in a machine direction at a tension rate of 5 mm/second at 20° C.

In the hard coat film, the substrate may preferably be a polycarbonate film having a thickness within a range of 30 to 200 μm, and the hard coat film has a characteristic that both of the hard coat layer and the substrate have no crack in case that the hard coat film is bent at a 180 degree-angle under a condition of 25° C. and 60 degree/second.

The present invention also provides a transparent electroconductive laminate having the hard coat film and a transparent electrically conducting layer formed on at least one surface of the hard coat film.

In the transparent electroconductive laminate, the transparent electrically conducting layer may preferably be a crystalline layer comprising indium oxide, and the transparent electrically conducting layer may preferably have a thickness within a range of 5 to 50 nm.

In the transparent electroconductive laminate, the transparent electroconductive laminate may preferably have a metal oxide layer between the hard coat layer and the transparent electrically conducting layer, and the metal oxide layer may preferably have a thickness within a range of 0.5 to 5.0 nm.

The present invention also provides a touch panel having the transparent electroconductive laminate.

The present invention also provides a composition for forming a high refractive index antiblocking layer comprising a first component and a second component, wherein
the first component is an unsaturated double bond containing acrylic copolymer, and
the second component comprises
(A) a phenolic novolac acrylate having two or more acrylate groups, and
(B) an aromatic group-containing mono or poly(meth)acrylate having 1 or 2 mols of an alkylene oxide structure with two or three carbon atoms in each molecule, wherein the second component comprises 60 to 85 parts by mass of the phenolic novolac acrylate (A) and 15 to 30 parts by mass of the (meth)acrylate (B), providing that 100 parts by mass of the second component, and
a difference of SP Values (ΔSP) of the first component (SP1) and the second component (SP2) is within a range of 1 to 4, and
a mass ratio of the first component to the second component in the composition is from 0.5:99.5 to 20:80, and
phase separation occurs between the first component and the second component after the composition for forming a high refractive index antiblocking layer is applied, to form an antiblocking layer having a microscopic convexoconcave on its surface.

In the composition for forming a high refractive index antiblocking layer, the phenolic novolac acrylate (A) may preferably be represented by the following formula (I):

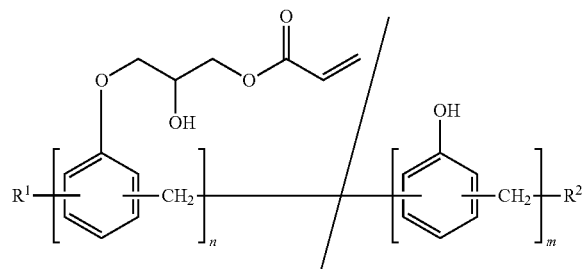

wherein $R^1$ represents H or $CH_2OH$, $R^2$ represents H or OH, n represents a number of 2 to 5 and m represents a number of 0 to 5.

In the composition for forming a high refractive index antiblocking layer, the (meth)acrylate (B) may preferably be an aromatic group-containing (meth)acrylate having a refractive index within a range of 1.56 to 1.64.

In the composition for forming a high refractive index antiblocking layer, a total content of ZnO, $TiO_2$, $CeO_2$, $SnO_2$, $ZrO_2$ and indium tin oxide in the composition may preferably be less than or equal to 0.0001% by mass.

The present invention also provides an antiblocking film having a transparent polymer substrate and an antiblocking layer which is obtainable by applying the composition on the substrate, wherein
the antiblocking layer has a refractive index within a range of 1.565 to 1.620, and
the antiblocking layer has an arithmetic average roughness (Ra) of 0.001 to 0.09 μm and a ten-point average roughness (Rz) of 0.01 to 0.5 μm.

In the antiblocking film, the antiblocking layer may preferably have a thickness within a range of 0.05 to 10 μm.

In the antiblocking film, the substrate may preferably be a PET film having a thickness within a range of 20 to 300 μm, and
the antiblocking film may preferably have a characteristic that the antiblocking layer has no crack in case that the antiblocking film is elongated by 15% in a machine direction at a tension rate of 5 m/minute at 20° C.

In the antiblocking film, the substrate may preferably be a polycarbonate film-having a thickness within a range of 30 to 200 μm, and
the antiblocking film may preferably have a characteristic that both of the antiblocking layer and the substrate have no crack in case that the antiblocking film is bent at a 180 degree-angle under a condition of 25° C. and 60 degree/second.

In the antiblocking film, the antiblocking film may preferably have a total light transmittance of not less than 88% and a haze value of not greater than 2%.

The present invention also provides a transparent electroconductive laminate having the antiblocking film and a transparent electrically conducting layer formed on at least one surface of the antiblocking film.

In the transparent electroconductive laminate, the transparent electrically conducting layer may preferably be a crystalline layer comprising indium oxide, and the transparent electrically conducting layer may preferably have a thickness within a range of 5 to 50 nm.

In the transparent electroconductive laminate, the transparent electroconductive laminate may preferably have a metal oxide layer between the antiblocking layer and the transparent electrically conducting layer, and the metal oxide layer may preferably have a thickness within a range of 0.5 to 5.0 nm.

The present invention also provides a touch panel having the transparent electroconductive laminate.

Advantageous Effect of the Invention

The hard coating composition according to the present invention provides a transparent hard coat layer which is applied on a transparent polymer substrate. The hard coat layer obtained by the hard coating composition according to the present invention has high visibility and high stretchability, as well as excellent hardness. The transparent hard coat layer which is formed by the hard coating composition according to the present invention has a technical characteristic of a high refractive index. Therefore, the present invention has an advantageousness without interference fringes in case that the transparent hard coat layer according to the present invention is applied onto a high refractive index substrate film such as a PET film or a polycarbonate film.

The hard coating composition according to the present invention also has a technical characteristic of providing a high refractive index, even if the hard coating composition does not substantially include high refractive index materials such as metal oxide. Therefore, the obtained transparent hard coat layer according to the present invention has a technical characteristic of a high stretchability, as well as a high refractive index and excellent hardness. In the present invention, the hard coating composition may include (C) a fluorene unit-containing (meth)acrylate having two or more (meth)acrylate groups, in addition to the components (A) and (B). Addition of the component (c) can provide a higher refractive index.

Using the hard coating composition according to the present invention has advantages such as providing a hard coat layer having stretchability, as well as high visibility and excellent hardness, in case that the hard coat layer (a transparent hard coat layer) is applied onto a high refractive index substrate film such as a PET film or a polycarbonate film.

The composition for forming a high refractive index antiblocking layer can provide an antiblocking layer (resin layer) having a microscopic convexoconcave on its surface, even if the composition is applied onto a substrate, and optionally dried, then the applied resin layer is photo-cured. The resulting antiblocking film has excellent hardness and scratch resistance. In addition, the antiblocking film has advantages without lowering of visibility or optical properties because of no-containing of particulate having a mean particle diameter of more than 0.5 μm. The antiblocking layer obtainable by applying the composition for forming a high refractive index antiblocking layer according to the present invention demonstrates prevention of blocking phenomenon (for example, interlaminar blocking) even if some of the films are piled up. In addition, the antiblocking film has advantages without blocking phenomenon (for example, difficulty of peeling from a winding role due to interlaminar blocking) even if the resulting antiblocking film is winded and is reposited as a winding role.

The antiblocking film according to the present invention has a technical feature of a high refractive index and excellent stretchability, as well as prevention of blocking phenomenon. The technical features can provide prevention of interference fringes, to arrive at excellent visibility.

DETAILED DESCRIPTION OF THE PREFERRED EMBODIMENTS

Figure 1:
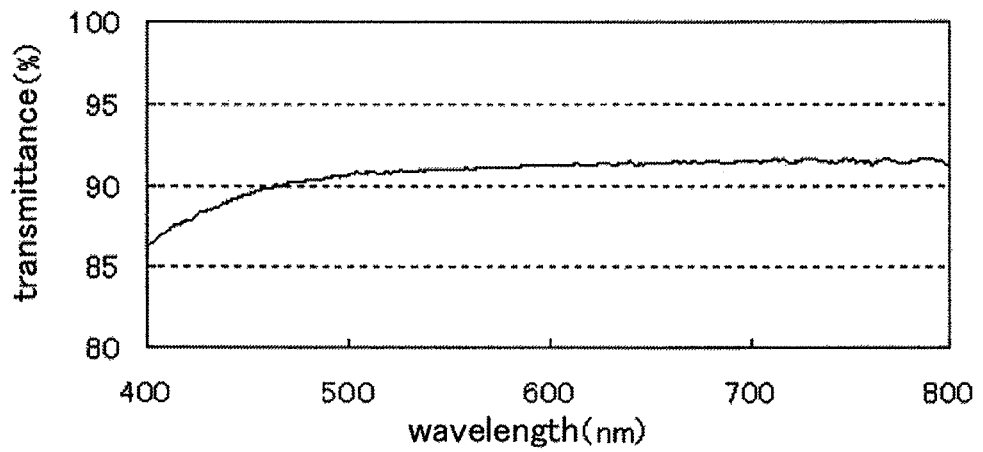
FIG. 1 is a graphical chart showing a transmission spectrum (transmittance) within a wavelength range of 400 to 800 nm of a hard coat layer obtained by the hard coating composition of Example E1.

The hard coating composition according to the present invention comprises (A) a phenolic novolac acrylate having two or more acrylate groups, and (B) an aromatic group-containing mono or poly(meth)acrylate having 1 or 2 mols of an alkylene oxide structure with two or three carbon atoms in each molecule.

The hard coating composition comprises 40 to 90 parts by mass of the phenolic novolac acrylate (A) and 10 to 30 parts by mass of the (meth)acrylate (B), providing that 100 parts by mass of a resin content in the hard coating composition.

(A) a Phenolic Novolac Acrylate Having Two or More Acrylate Groups

The hard coating composition according to the present invention contains (A) a phenolic novolac acrylate having two or more acrylate groups. The hard coating composition containing the phenolic novolac acrylate (A) can provide a hard coat layer with a high refractive index having transparency and excellent hardness. The technical feature can effectively prevent appearance of interference fringes.

The phenolic novolac acrylate (A) may preferably be represented by the following formula (I):

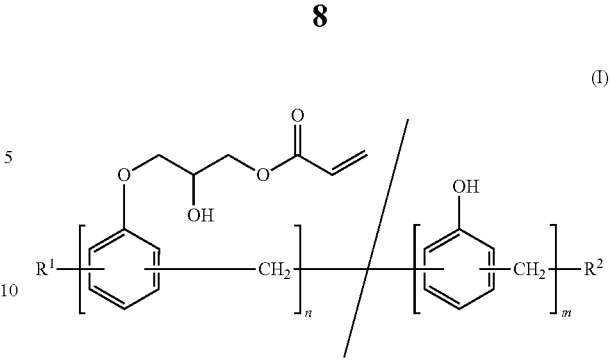

(I)

wherein $R^1$ represents H or $CH_2OH$, $R^2$ represents H or OH, n represents a number of 2 to 5 and m represents a number of 0 to 5.

In the following formula (I), n may preferably represent a number of 2 to 4 and m may preferably represent a number of 0 to 3, more preferably n may represent a number of 2 to 4 and m may represent a number of 0 to 1.

The phenolic novolac acrylate (A) may preferably have a weight average molecular weight of 400 to 2500, more preferably 450 to 2000. The phenolic novolac acrylate (A) may preferably have a hydroxyl value of 100 to 180 mgKOH/g, more preferably 120 to 160 mgKOH/g.

In this specification, weight average molecular weights of various components can be measured by gel permeation chromatography (GPC). In a measurement of weight average molecular weights, a high performance gel permeation chromatography apparatus such as HLC-8220GPC (manufactured by Tosoh Corporation) can be used. A concrete measurement condition of weight average molecular weights in use of HLC-8220GPC (manufactured by Tosoh Corporation) is, for example, measuring a test sample (2 g), drying the test sample in a vacuum dryer at 40° C. for 2 hours to remove a water, diluting the sample by THF solution in a concentration of 0.2%, then measuring under the following conditions: column injection amount of 10 μl, flow late of 0.35 ml/min.

In the present invention, the hard coating composition comprises 60 to 85 parts by mass of the phenolic novolac acrylate (A) providing that 100 parts by mass of a resin content in the hard coating composition. When an amount of the phenolic novolac acrylate (A) is less than 60 parts by mass or an amount of the phenolic novolac acrylate (A) is more than 85 parts by mass, a hardness of the resulting hard coat layer is lowered, respectively.

(B) an Aromatic Group-Containing Mono or Poly(Meth) Acrylate Having 1 or 2 Mols of an Alkylene Oxide Structure with Two or Three Carbon Atoms in Each Molecule The hard coating composition according to the present invention contains (B) an aromatic group-containing mono or poly(meth)acrylate having 1 or 2 mols of an alkylene oxide structure with two or three carbon atoms in each molecule. The (meth)acrylate (B) may preferably have a viscosity of less than 300 mPa·s and a refractive index within a range of 1.56 to 1.64.

In the (meth)acrylate of the component (B), the presence of 1 or 2 mols of an alkylene oxide structure in each molecular in which the alkylene oxide structure has two or three carbon atoms enables the design of a viscosity of the component (B) of less than 300 mPa·s.

In addition, the presence of 1 or 2 mols of an alkylene oxide structure in each molecular in which the alkylene oxide structure has two or three carbon atoms of the (meth)acrylate component (B) can provide improved stretchability of the resulting hard coat layer.

The alkylene oxide structure having two or three carbon atoms includes an ethylene oxide structure and a propylene oxide structure.

The (meth)acrylate of the component (B) also has a technical feature of having an aromatic group(s).

The presence of the aromatic group(s) in the (meth) acrylate of the component (B) can provide a high refractive index, for example, within a range of 1.56 to 1.64.

An aromatic group-containing (meth)acrylate which can be preferably used as the component (B) includes, for example, a (meth)acrylate having 1 or 2 mols of an alkylene oxide structure in each molecular in which the alkylene oxide structure has two or three carbon atoms, such as alkylene oxylated phenol(meth)acrylate, alkylene oxylated orthophenylphenol(meth)acrylate, alkylene oxylated metaphenylphenol(meth)acrylate, alkylene oxylated paraphenylphenol(meth)acrylate, alkylene oxylated cumylphenylphenol(meth)acrylate and so on. In the above compounds, a (meth)acrylate having two aromatic groups may preferably be used due to its high refractive index.

An refractive index of the component (B) can be measured by an Abbe's refractometer in conformity with JIS (Japanese Industrial Standard) K0062.

The component (B) may preferably have a viscosity of less than 300 mPa·s. When the viscosity is not less than 300 mPa·s, the composition's hardening reactivity may be deteriorated and a hardness of the resulting hard coat layer may be lowered. The component (B) may more preferably have a viscosity of 1 to 300 mPa·s, most preferably 1 to 200 mPa·s.

A viscosity of the component (B) can be measured by a B-type viscometer (TVB-22L, manufactured by Toki Sangyo co., ltd.). A B-type viscometer includes, for example, TVB-22L manufactured by Toki Sangyo co., ltd.

The (meth)acrylate (B) may preferably have a weight average molecular weight within a range of 150 to 600, more preferably 200 to 400.

In the present invention, the hard coating composition comprises 15 to 30 parts by mass of the component (B) providing that 100 parts by mass of a resin content in the hard coating composition. The presence of the component (B) within the above mass amount in the coating composition provides advantages such as excellent hardness and a high refractive index of the resulting hard coat layer. When an amount of the component (B) is less than 15 parts by mass or an amount of the component (B) is more than 30 parts by mass, a hardness of the resulting hard coat layer is lowered, respectively.

(C) a Fluorene Unit-Containing (Meth)Acrylate Having Two or More (Meth)Acrylate Groups An embodiment of the hard coating composition according to the present invention includes an embodiment of further containing (C) a fluorene unit-containing (meth)acrylate having two or more (meth)acrylate groups, in addition to the above components (A) and (B). Using the fluorene unit-containing (meth)acrylate (C) has advantages such as enabling the design of a higher refractive index in the resulting hard coat layer, because the fluorene unit-containing (meth)acrylate (C) has a high refractive index.

A preferable example of the fluorene unit-containing (meth)acrylate (C) may include an acrylic monomer which is represented by the following formula (II):

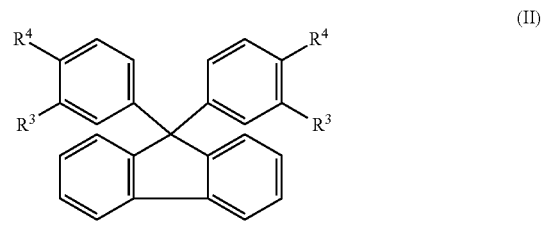

wherein each of $R^3$ independently represents H or $CH_3$, $R^4$ represents $-A-OC(O)CR=CH_2$, wherein A independently represents $-OCH_2CH_2-$, $-OCH_2CH_2CH_2-$, $-OCH(CH_3)CH_2-$ or $-OCH_2CH(CH_3)-$ and R independently represents H or $CH_3$.

A more preferable example of the fluorene unit-containing (meth)acrylate (C) may include an acrylic monomer which is represented by the following formula (II)-1:

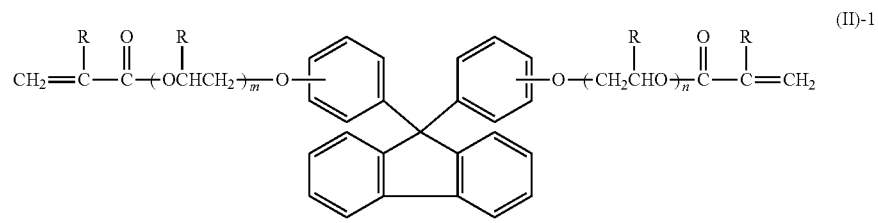

wherein each of R independently represents H or $CH_3$, and each of m and n independently represents a number of 1 to 5.

Commercially available products may be used as the fluorene unit-containing (meth)acrylate (C). A commercially available fluorene unit-containing (meth)acrylate (C) includes, for example, NK ester series available from Shin-Nakamura Chemical Co., Ltd., Ogsol EA series available from Osaka Gas Chemicals Co., Ltd.

A commercially available product which is represented by the above formula (II)-1 includes, for example, Ogsol EA-0200 (each of R represents H, and m+n=2), Ogsol EA-0500 (each of R represents H, and m+n=5), Ogsol EA-1000 (each of R represents H, and m+n=10), QOgsol EA-F5003 (each of R represents H, a low-viscosity product) and Ogsol EA-F5503 (each of R represents H, a low-viscosity product).

When the hard coating composition contains the fluorene unit-containing (meth)acrylate (C), the hard-coating composition comprises 40 to 70 parts by mass of the phenolic novolac acrylate (A), 10 to 30 parts by mass of the (meth)

acrylate (B) and 15 to 40 parts by mass of the fluorene unit-containing (meth)acrylate (C), providing that 100 parts by mass of a resin content in the hard coating composition.

When the hard coating composition contains the fluorene unit-containing (meth)acrylate (C), it should be necessary that the hard coating composition comprises 40 to 70 parts by mass of the phenolic novolac acrylate (A), providing that 100 parts by mass of a resin content in the hard coating composition. When an amount of the phenolic-novolac acrylate (A) is less than 40 parts by mass or an amount of the phenolic novolac acrylate (A) is more than 70 parts by mass, a hardness of the resulting hard coat layer is lowered, respectively.

When the hard coating composition contains the fluorene unit-containing (meth)acrylate (C), it should be necessary that the hard coating composition comprises 10 to 30 parts by mass of the (meth)acrylate (B), providing that 100 parts by mass of a resin content in the hard coating composition. The presence of the component (B) within the above mass amount in the coating composition provides advantages such as excellent hardness and a high refractive index of the resulting hard coat layer. When an amount of the (meth)acrylate (B) is less than 10 parts by mass or an amount of the (meth)acrylate (B) is more than 30 parts by mass, a hardness of the resulting hard coat layer is lowered, respectively.

When the hard coating composition contains the fluorene unit-containing (meth)acrylate (C), it should be necessary that the hard coating composition comprises 15 to 40 parts by mass of the fluorene unit-containing (meth)acrylate (C), providing that 100 parts by mass of a resin content in the hard coating composition. When an amount of the fluorene unit-containing (meth)acrylate (C) is more than 40 parts by mass, a hardness of the resulting hard coat layer may be lowered.

Another (Meth)Acrylate

A hard coating composition according to the present invention may contain another (meth)acrylate in addition to the components (A) and (B), and optional component (C). Such an another (meth)acrylate includes, for example, polyfunctional (meth)acrylate monomer and/or polyfunctional (meth)acrylate oligomer. The polyfunctional (meth)acrylate monomer and/or polyfunctional (meth)acrylate oligomer can cause a cure reaction due to a (meth)acryloyl group reaction, with an exposure to active energy rays after applying the hard coating composition. The cure reaction can provide a hard coat layer with excellent hardness, in which may be advantageous.

The polyfunctional (meth)acrylate monomer and/or polyfunctional (meth)acrylate oligomer may preferably have monomer and/or oligomer having three or more (meth)* acryloyl groups. Having three or more (meth)acryloyl groups can provide a hard coat layer having excellent hardness with an exposure to active energy rays, in which may be advantageous.

The polyfunctional (meth)acrylate monomer and/or polyfunctional (meth)acrylate oligomer includes, for example, hydroxypropylated trimethylolpropane triacrylate, isocyanuric acid ethylene oxide modified diacrylate, pentaerythritol triacrylate, dipentaerythritol pentaacrylate, trimethylolpropane triacrylate, tris(acryloxyethyl), ditrimethylolpropane tetraacrylate, pentaerythritol tetraacrylate, dipentaerythritol hexaacrylate and oligomers thereof. The monomer and/or oligomer may be used with alone or a combination of two or more.

When the hard coating composition contains the monomer and/or oligomer, the hard coating composition may preferably contain 1 to 30 parts by mass of the monomer and/or oligomer, more preferably 1 to 25 parts by mass, providing that 100 parts by mass of a resin content in the hard coating composition.

Polymerization Initiator and the Like

The hard coating composition according to the present invention may preferably contain a polymerization initiator. Containing a polymerization initiator may provide an excellent polymerization of resin components with an exposure to active energy rays such as ultraviolet rays. The polymerization initiator includes, for example, alkyl phenon type photopolymerization initiator, acyl phosphine oxide type photopolymerization initiator, titanocene type photopolymerization initiator, oxime ester type photopolymerization initiator, and the like. An alkyl phenon type photopolymerization initiator includes, for example, 2,2-dimethoxy-1,2-diphenylethane-1-one, 1-hydroxy cyclohexyl phenyl ketone, 2-hydroxy-2-methyl-1-phenyl propane-1-one, 1-[4-(2-hydroxyethoxy)-phenyl]-2-hydroxy-2-methyl-1-propane-1-one, 2-hydroxy-1-{4-[4-(2-hydroxy-2-methyl propionyl)benzyl]phenyl}-2-methyl propan-1-one, 2-methyl-1-(4-methylthiophenyl)-2-morpholinopropan-1-one, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone and the like. An acyl phosphine oxide type photopolymerization initiator includes, for example, 2,4,6-trimethyl benzoyl diphenyl phosphine oxide, bis(2,4,6-trimethyl benzoyl) phenyl phosphine oxide and the like. A titanocene type photopolymerization initiator includes, for example, bis(η5-2,4-cyclopentadiene-1-yl)-bis(2,6-difluoro-3-(1H-pyrrol-1-yl) phenyl)titanium and the like. An oxime ester type photopolymerization initiator includes, for example, 1,2-octanedione, 1-[4-(phenylthio)-, 2-(O-benzoyloxime)], ethanone, 1-[9-ethyl-6-(2-methyl benzoyl)-9H-carbazole-3-yl]-, 1-(O-acetyl oxime), oxyphenylacetic acid, 2-[2-oxo-2-phenyl acetoxy ethoxy]ethyl ester, 2-(2-hydroxy ethoxy) ethyl ester and the like. These photopolymerization initiator may be used with alone or a combination of two or more.

In the above photopolymerization initiators, 2-hydroxy-2-methyl-1-phenyl propan-1-one, 1-hydroxy cyclohexyl phenyl ketone, 2-methyl-1-(4-methylthiophenyl)-2-morpholinopropan-1-one, 2-benzyl-2-dimethylamino-1-(4-morpholinophenyl)butanone-1,2,2-dimethoxy-1,2-diphenyl ethan-1-one and the like may be preferably used.

A preferable amount of the photopolymerization initiator may be 0.01 to 20 parts by mass, more preferably 1 to 10 parts by mass, providing that 100 parts by mass of the components (A) and (B), and optional component (C) and another monomer and/or oligomer (a total of all these components is called "resin components").

The hard coating composition according to the present invention may contain a solvent. A solvent is not limited and may be appropriately selected with consideration of the components of the hard coating composition, a type of a substrate to be applied, means for application and the like. A solvent includes, for example, aromatic solvents such as toluene, xylene; ketone solvents such as methyl ethyl ketone, acetone, methyl isobutyl ketone, cyclohexanone; ether solvents such as diethyl ether, isopropyl ether, tetrahydrofuran, dioxane, ethyleneglycol dimethyl ether, ethyleneglycol diethyl ether, diethyleneglycol dimethyl ether, diethyleneglycol diethyl ether, propyleneglycol monomethyl ether, anisole, phenetole; ester solvents such as ethyl acetate, butyl acetate, acetic acid isopropyl, ethylene glycol diacetate; amide solvents such as dimethylformamide, diethylformamide, N-methylpyrrolidon; cellosolve solvents such as methylcellosolve, ethylcellosolve, butyl cellosolve; alcohol solvents such as methanol, ethanol, propanol; halogen solvents such as dichloromethane, chloroform; and the like. The solvent may be used with alone or a combination of two or more. In the above solvents, ester solvents, ether solvents, alcohol solvent and ketone solvent may preferably be used.

The hard coating composition may optionally contain an additive. The additive includes conventional additives such as an antistatic agent, a plasticizer, a surfactant, an antioxidant and the like.

The hard coating composition according to the present invention has a technical feature that the hard coating composition can provide a hard coat layer with an high refractive index even if the hard coating composition does not contain a high refractive index material of metal oxide such as ZnO, $TiO_2$, $CeO_2$, $SnO_2$, $ZrO_2$ and indium tin oxide. Therefore, the hard coating composition may preferably contain no metal oxide high refractive index materials selected from the group consisting of ZnO, $TiO_2$, $CeO_2$, $SnO_2$, $ZrO_2$ and indium tin oxide. For more details, a total content of ZnO, $TiO_2$, $CeO_2$, $SnO_2$, $ZrO_2$ and indium tin oxide in the hard coating composition may preferably be less than or equal to 0.0001% by mass. When the high refractive index materials such as a metal oxide are included in a hard coat layer, the hard coat layer generally has inferior stretchability and bending resistance compared with a hard coat layer without the high refractive index materials.

Hard Coat Film

The present invention further relates to a hard coat film obtained by applying the hard coating composition. The hard coat film has a transparent polymer substrate and a hard coat layer which is obtained by applying the hard coating composition on the substrate. The hard coat layer according to the present invention has a technical feature of a high refractive index within a range of 1.565 to 1.620.

In the hard coat film according to the present invention, a PET (polyethylene terephthalate) film or a polycarbonate film may preferably be used as the transparent polymer substrate. A PET film and a polycarbonate film may preferably be used as a substrate film for a transparent electrically conducting layer of a touch panel because the films have excellent film strength and high transparency, and are inexpensive. On the other hand, the films generally have a high refractive index of not less than 1.5. The refractive indexes of the films are higher than refractive indexes of conventional resin components which are used in a hard coat film. Thus there is a refractive index difference between the films and a hard coat layer, in which causes a problem of high-frequency of interference fringes.

In this specification, interference fringes mean a iridescence reflection which is induced by light interference of interface reflections in a multilaminate which is composed of a transparent film, transparent coat layer and the like. Especially, the interference fringes tend to be frequently appeared under an irradiation of a three-wavelength region emission fluorescent lamp. The three-wavelength region emission fluorescent lamp is a fluorescent lamp characterized by clear and distinct visibility, in which the three-wavelength region emission fluorescent lamp has enhanced emission intensities at specific wavelengths.

The hard coating composition according to the present invention has a technical feature of providing the hard coat layer with high refractive index. That is, the present invention has a technical feature of preventing appearance of interference fringes even if the hard coating composition is applied on a transparent polymer film such as a PET film or a polycarbonate film to obtain the transparent hard coat layer.

On the other hand, the hard coat film may be applied on another substrate film other than a PET film and a polycarbonate film. Such an another substrate film includes, for example, a triacetylcellulose (TAC) film, a diacetylene cellulose film, an acetate butylate cellulose film, a polyethersulfone film, a polyacrylic resin film, a polyurethane resin film, a polyester film, a polysulfone film, a polyether film, a polymethyl pentene film, a polyether ketone film, a (meth) acrylonitrile film and the like.

A thickness of the transparent polymer substrate may appropriately be selected with consideration of a use, and may be generally 20 µm to 300 µm.

A hard coat layer is formed by applying the above hard coating composition onto a transparent polymer substrate. A method for applying the hard coating composition may appropriately be selected with consideration of components including the hard coat composition and a coating step, and may include, for example, a dip coating method, an air knife coating method, a curtain coating method, a roller coating method, a wire bar coating method, a gravure coating method, an extrusion coating method (described in U.S. Pat. No. 2,681,294) and the like.

A thickness of the hard coat layer is not limited and may appropriately be selected with consideration of use and other factors. For example, the hard coating composition may be applied so as to obtain a hard coat layer of 0.01 µm to 20 µm.

The hard-coat layer is formed by curing a coating film obtained by applying the hard coating composition. The curing can be generated by irradiation of active energy rays with appropriate wavelength emitted by a light source. Irradiation of active energy rays may be a light having exposure value of, for example, 0.1 to 1.5 $J/cm^2$, preferably 0.3 to 1.5 $J/cm^2$. A wavelength region of irradiation light is not limited and may appropriately be, for example, not greater than 360 nm. A light with such wavelength can be obtained by a high-pressure mercury lamp, an extra high-pressure mercury lamp and the like.

The hard coat film according to the present invention has a technical characteristic of having a hard coat layer with high refractive index in a range of 1.565 to 1.620, even if the hard coat layer does not substantially include high refractive index materials such as metal oxide. A refractive index of the hard coat layer can be measured by an Abbe's refractometer in conformity with JIS (Japanese Industrial Standard) K7142.

The hard coat film according to the present invention may preferably have a total light transmittance of not less than 85%, more preferably not less than 90%. In addition, the hard coat film according to the present invention may preferably have a haze value of not more than 2%, more preferably not more than 1%. In the present invention, the hard coat film has a technical characteristic of having a high refractive index without including high refractive index materials such as ZnO, $TiO_2$, $CeO_2$, $SnO_2$ and $ZrO_2$, and needs not include such high refractive index materials. Therefore, the present invention can arrive at the above high total light transmittance and low haze value.

A total light transmittance ($T_t(\%)$) is obtained by measuring an incident light intensity ($T_0$) for a hard coat film and a total transmitted light intensity ($T_1$) through the hard coat film, and calculating the following formula:

$$Tt\ (\%) = \frac{T1}{T0} \times 100$$

A Haze value is obtained by calculating the following formula, in conformity with JIS (Japanese Industrial Standard) K7105:

$$H\ (\%) = \frac{Td}{Tt} \times 100$$

H: a Haze value (a fogging value) (%)
$T_d$: a diffuse transmittance (%)
$T_t$: a total light transmittance (%)

Measurement of a total light transmittance and a haze value can be performed by use of, for example, a haze meter (manufactured by Suga Test Instruments Co., Ltd.).

The hard coat layer obtained by applying the hard coating composition according to the present invention has a technical characteristic of having stretchability, as well as excellent hardness and a high refractive index. Therefore, the hard coat film according to the present invention is suitable for preparing a film having a transparent electrically conducting layer which is included in, for example, a touch panel.

In various devices having a touch panel, such as mobile phones like smart phones, tablet personal computers or handheld terminal devices, there is a strong demand for downsizing, thinning and lightening. Therefore, in various members including a touch panel electrode, there is a demand for thinning of a substrate film. On the other hand, thinning of a substrate film causes frequent defect appearance of a warp and a curl of a film in case of applying a hard coat layer on the substrate, in which provides lowering of workability and productivity. These defects seem to result from a difference of physical performances such as thermal shrinkage and thermal expansion of a hard coat layer and a substrate film. The hard coat film according to the present invention tends to have decreased curl for various substrates because of an excellent stretchability of the hard coat film.

On the hard coat film according to the present invention, various functional layers such as a transparent electrically conducting layer, an optical interference layer for controlling reflectance by an optical interference may optionally be applied in an optional and appropriate order. An applying order of these transparent electrically conducting layer, optical interference layer and hard coat layer are not limited as long as these layers demonstrate desired functionalities for their purposes. In a touch panel, embodiments of their applying orders may, for example, be the followings, wherein a transparent electrically conducting layer is denoted as "A", an optical interference layer is denoted as "B", the hard coat layer according to the present invention is denoted as "C", a transparent polymer substrate is denoted as "D", a hard coat layer out of the present invention is denoted as "E": A/B/C/D/E, A/B/C/D/C, A/B/B/C/D/E, A/B/B/C/D/C, A/C/D/E/B, A/C/D/C/B, A/C/D/E/B/B, A/C/D/C/B/B, and the like.

The above optical interference layer means a layer for preventing or controlling a reflected light in combination with a high refractive index layer and a low refractive index layer as appreciate. The optical interference layer comprises at least one high refractive index layer and at least one low refractive index layer. The optical interference layer may comprise two or more combination units of a high refractive index layer and a low refractive-index layer. When the optical interference layer is composed of one high refractive index layer and one low refractive index layer, the optical interference layer may preferably have a thickness of 30 nm to 150 nm, more preferably 50 nm to 150 nm. The optical interference layer may be applied by a wet process or a dry process. A wet process may be, for example, a doctor knife method, bar coater method, a gravure roll coater method, a curtain coater method, a knife coater method, a spin coater method, a spray method, a dipping method or the like. A dry process may be, for example, a physical vapor deposition (PVD) such as a sputtering method, a Vacuum deposition method, an ion plating method and the like; a printing process; or a chemical vapor deposition (CVD).

A transparent electroconductive laminate included in a touch panel and the like is generally a film having a transparent electrically conducting layer. The transparent electrically conducting layer is not limited and may preferably be a crystalline layer containing indium oxide, for more details, a crystalline layer containing indium ingredient as a major ingredient such as indium tin oxide (ITO) and indium zinc oxide (IZO). The transparent electrically conducting layer may be applied by a physical vapor deposition (PVD) such as a sputtering method, a vacuum deposition method, an ion plating method and the like; a coating process; a printing process; or a chemical vapor deposition (CVD), preferably a physical vapor deposition (PVD) or a chemical vapor deposition (CVD).

In a processing for applying a transparent electrically conducting layer, a substrate film having a hard coat layer is exposed a partial load. The partial load may cause a kink of a film which results from a difference of thermal shrinkage and/or thermal expansion among a transparent electrically conducting layer, a hard coat layer and a substrate film in a transparent electroconductive laminate. The hard coat layer obtained by applying the hard coating composition according to the present invention has a technical characteristic of having high stretchability, as well as excellent hardness and a high refractive index. Therefore, even if a substrate film is exposed a partial thermal load such as heating at a stage of applying a transparent electrically conductive layer and obtains a partial thermal expansion, the hard coat film according to the present invention has advantages such as decreased kink because of excellent stretchability of the hard coat layer and accompanying followings of the hard coat layer.

As for stretchability of the hard coat layer, for more details, in case that a substrate for applying the hard coating composition is a PET film having a thickness within a range of 20 μm to 300 zμm, the hard coat film may have a characteristic that the hard coat layer has no crack in which the hard coat film is elongated by 15% in a machine direction at a tension rate of 5 mm/second. In that case, the hard coat layer may have a thickness of, for example, 0.05 μm to 10 μm.

A polymer substrate film is generally manufactured by a biaxial orientation method, in which a resin material in a molten state is wound in a roll, under two direction extension of a machine direction (in the direction of winding: MD direction) and a transverse direction (intersecting the direction of winding almost perpendicularly: TD direction), to obtain a film having uniform thickness. In the manufacturing method, the resulting film has higher stress in MD direction. Therefore, the resulting film tends to generate a thermal expansion and a thermal contraction in MD direction. By means of a film test of the resulting hard coat film by elongating in a machine direction, that is, in the wound direction under winding of manufacturing the polymer substrate film, there is an advantage that a practical test of cracking (fissures of a film) can be performed.

In case that a transparent polymer substrate of the hard coat film is a polycarbonate film, a bending resistance test of the hard coat film can be evaluated as stretchability of the resulting hard coat layer. Polycarbonates are a material having excellent physical properties such as heat resistance and impact resistance. On the other hand, in case those polycarbonates are in a form of thin film, the film sometimes obtains cracking (fissures of a film) by a stress such as folding. When a polycarbonate film having a thin thickness is used as a substrate film, high stretchability of the hard coat layer applied on the substrate film can prevent occurrence of cracking of the substrate film by applying the hard coat layer onto the substrate film. The hard coat layer obtained by the hard coating composition according to the present invention has high stretchability. Therefore, applying the hard coat layer according to the present invention on such a thin thickness polycarbonate film which is used as a substrate film can improve a toughness against folding stress and is advantage. For more details, in case that a substrate for applying the hard coating composition is a polycarbonate film having a thickness within a range of 30 μm to 200 μm, the hard coat film may have a characteristic that both of the hard coat layer and the substrate have no crack in which the hard coat film is bent at a 180 degree-angle under a condition of 25° C. and 60 degree/second. In that case, the hard coat layer may have a thickness of, for example, 0.05 μm to 10 μm.

The hard coat layer obtained by applying the hard coating composition according to the present invention is characterized by having high visibility and stretchability, as well as excellent hardness. The transparent hard coat layer obtained from the hard coating composition according to the present invention is characterized by having high refractive index. That is, the present invention has a technical feature of preventing appearance of interference fringes even if the hard coating composition is applied on a transparent polymer film such as a PET film or a polycarbonate film to obtain a transparent hard coat layer. Therefore, the hard coat layer according to the present invention is suitable for preparing a film having a transparent electrically conducting layer which is included in, especially, a touch panel.

A Composition for Forming a High Refractive Index Antiblocking Layer

A composition for forming a high refractive index antiblocking layer according to the present invention contains a first component and a second component. The first component is an unsaturated double bond containing acrylic copolymer. The second component contains (A) a phenolic novolac acrylate having two or more acrylate groups, and (B) an aromatic group-containing mono or poly(meth)acrylate having 1 or 2 mols of an alkylene oxide structure with two or three carbon atoms in each molecule. It is subject to that the second component contains 60 to 85 parts by mass of the phenolic novolac acrylate (A) and 15 to 30 parts by mass of the (meth)acrylate (B), providing that 100 parts by mass of the second component. Furthermore, it is subject to that a difference of SP values (ΔSP) of the first component (SP1) and the second component (SP2) is within a range of 1 to 4, and a mass ratio of the first component and the second component in the composition satisfies the following formula, the first composition:the second composition=0.5: 99.5 to 20:80.

The composition for forming a high refractive index antiblocking layer has a technical feature of that phase separation occurs between the first component and the second component after the composition is applied, to form an antiblocking layer having a microscopic convexoconcave on its surface.

A First Component

An unsaturated double bond containing acrylic copolymer is used as the first component. The unsaturated double bond containing acrylic copolymer may be, for example, a resin obtained by a copolymerization of a (meth)acrylate monomer and other monomer having ethylene unsaturated double bond; a resin obtained by a copolymerization of a (meth) acrylate monomer and other monomer having ethylene unsaturated double bond and epoxy group; a resin obtained by copolymerizing a (meth)acrylate monomer and other monomer having ethylene unsaturated double bond and isocyanate group, then reacting a component having unsaturated double bond and other functional group, such as acrylic acid or glycidyl acrylate; and the like. These unsaturated double bond containing acrylic copolymers may be used with alone or a combination of two or more. The unsaturated double bond containing acrylic copolymer may preferably have a weight average molecular weight of 2000 to 100000, more preferably 5000 to 50000.

A Second Component

The second component contains (A) a phenolic novolac acrylate having two or more acrylate groups, and (B) an aromatic group-containing mono or poly(meth)acrylate having 1 or 2 mols of an alkylene oxide structure with two or three carbon atoms in each molecule.

The components (A) and (B) are described as follows.

(A) A Phenolic Novolac Acrylate Having Two or More Acrylate Groups

A phenolic novolac acrylate having two or more acrylate groups (A) is a same component of the component (A) in the hard coating composition, i.e., the phenolic novolac acrylate having two or more acrylate groups (A), thus its detailed description is omitted.

An amount of the phenolic novolac acrylate (A) is 60 to 85 parts by mass providing that 100 parts by mass of the second component. When an amount of the phenolic novolac acrylate (A) is less than 60 parts by mass or an amount of the phenolic novolac acrylate (A) is more than 85 parts by mass, a hardness of resulting antiblocking layer is lowered, respectively.

(B) An Aromatic Group-Containing Mono or Poly(Meth) Acrylate Having 1 or 2 Mols of an Alkylene Oxide Structure with Two or Three Carbon Atoms in Each Molecule A component (B) is a same component of the component (B) in the hard coating composition, i.e., the aromatic group-containing mono or poly(meth)acrylate having 1 or 2 mols of an alkylene oxide structure in each molecular in which the alkylene oxide structure has two or three carbon atoms (B), thus its detailed description is omitted.

An amount of the component (B) is 15 to 30 parts by mass providing that 100 parts by mass of the second component. When an amount of the component (B) is less than 15 parts by mass or an amount of the component (B) is more than 30 parts by mass, a hardness of resulting antiblocking layer is lowered, respectively.

Another (Meth)Acrylate

The second component in the composition for forming a high refractive index antiblocking layer according to the present invention may contain another (meth)acrylate in addition to the components (A) and (B). The another (meth) acrylate is a same component of the another (meth)acrylate in the hard coating composition, thus its detailed description is omitted.

In case that the second component in the composition for forming a high refractive index antiblocking layer according to the present invention contains the another (meth)acrylate, an amount of the another (meth)acrylate may preferably be 1 to 30 parts by mass providing that 100 parts by mass of the second component, more preferably 1 to 25 parts by mass.

A Composition for Forming a High Refractive Index Antiblocking Layer

The composition for forming a high refractive index antiblocking layer according to the present invention can be prepared by mixing the first component and the second component, and an optional solvent, and optional additives such as a photopolymerization initiator, a catalyst, a photosensitizer. A mass ratio of the first component and the second component in the composition for forming a high refractive index antiblocking layer according to the present invention satisfies the following formula, the first composition:the second composition=0.5:99.5 to 20:80. The mass ratio may preferably be, the first composition:the second composition=1:99 to 20:80, more preferably be, the first composition:the second composition=1:99 to 15:85.

In the composition for forming a high refractive index antiblocking layer, phase separation occurs based on a difference between a SP value of the first component and a SP value of the second component. The phase separation provides a formation of an antiblocking layer having a microscopic convexoconcave on its surface. In the present invention, it is subject to that a difference of SP values ($\Delta SP$) of the first component (SP1) and the second component (SP2) is within a range of 1 to 4. When the difference of the first component (SP1) and the second component (SP2) is not less than 1, the first component and the second component are less compatible. Thus phase separation seems to occur between the first component and the second component after the composition for forming a high refractive index antiblocking layer is applied. The difference of SP values ($\Delta SP$) may preferably be within a range of 2.0 to 3.5.

A SP value means a solubility parameter, and is a criterion for solubility. The more SP value means a higher polarity, and the little SP value means a lower polarity.

The SP value can be determined by the following procedure.
Reference: Suh, Clarke [J.P.S.A.-1, 5, 1671-1681 (1967)]
Measuring temperature: 20° C.
Sample: A resin (0.5 g) is measured and is put into a 100 ml beaker, next, 10 ml of a good solvent is added using a whole pipette and is dissolved by means of a magnetic stirrer.
Solvent:
Good solvent: Dioxane, acetone, and the like
Poor solvent: n-Hexane, deionized water, and the like
Determination of cloud point: Using a 50 ml biuret, the poor solvent is dropped and read the amount dripped up to the point where clouding takes place.

A SP value $\delta$ of a resin is given by the following equation:

$$\delta = (V_{ml}^{1/2}\delta_{ml} + V_{mh}^{1/2}\delta_{mh})/(V_{ml}^{1/2} + V_{mh}^{1/2})$$

$$V_m = V_1 V_2/(\varphi_1 V_2 + \varphi_2 V_1)$$

$$\delta_m = \varphi_1 \delta_1 + \varphi_2 \delta_2$$

$V_i$: a molar volume of each solvent (ml/mol)
$\varphi_i$: a volume fraction of each solvent at cloud point
$\delta_i$: a SP value of each solvent
ml: low SP poor solvent mixture system
mh: high SP poor solvent mixture system The composition for forming a high refractive index antiblocking layer according to the present invention may further contain a solvent, a photopolymerization initiator, and an additive, in addition to the first component and the second component.

In case that the first component and the second component are the above combinations, a suitable solvent includes, for example, a ketone solvent such as methyl ethyl ketone, acetone, methyl isobutyl ketone, cyclohexanone and the like; an alcohol solvent such as methanol, ethanol, propanol, isopropanol, butanol and the like; an ether solvent such as anisole, phenetole, propylene glycol monomethylether, ethyleneglycol dimethyl ether, ethyleneglycol diethyl ether, diethyleneglycol dimethyl ether, diethyleneglycol diethyl ether, and the like. These solvents may be used with alone or a combination of two or more. In case that a solvent are included in the composition, an amount of the solvent may preferably be 1 to 9900 parts by mass providing that 100 parts by mass of a total mass of the first component and the second component (a total of all these components is called "resin components"), more preferably 10 to 900 parts by mass.

The composition for forming a high refractive index antiblocking layer according to the present invention may preferably contain a photopolymerization initiator. The photopolymerization initiator includes, for example, 2-hydroxy-2-methyl-1-phenyl propan-1-one, 1-hydroxy cyclohexyl phenyl ketone, 2-methyl-1-[4-(methylthio)phenyl]-2-morpholino propan-1-one, 2,2-dimethoxy-1,2-diphenylethan-1-one, 2-benzyl-2-dimethylamino-1-(4-morpholino phenyl)-butanone-1, and the like. A preferable amount of the photopolymerization initiator may be 0.01 to 20 parts by mass providing that 100 parts by mass of the resin components, more preferably 1 to 10 parts by mass.

The composition for forming a high refractive index antiblocking layer according to the present invention may optionally contain a conventional additive such as an antistatic agent, a plasticizer, a surfactant, an antioxidant, an ultraviolet absorber and the like. In case that such additive(s) is included in the composition, an amount of the additive(s) may preferably be 0.01 to 20 parts by mass providing that 100 parts by mass of the resin components, more preferably 1 to 10 parts by mass.

The composition for forming a high refractive index antiblocking layer according to the present invention has a technical feature of obtaining a resin layer with convexoconcave without including particles such as resin particles. Therefore the composition for forming high refractive index antiblocking layer may preferably include no resin particles. On the other hand, the composition for forming a high refractive index antiblocking layer may optionally contain at least one of inorganic particles, organic particles and a complex material thereof. These particles may be added not for the purpose of forming convexoconcave on a surface of the resin layer. These particles may be added for the purpose of controlling phase separation and a segregation to obtain more microscopic convexoconcave. These particles may have a mean diameter of not greater than 0.5 µm, preferably 0.01 µm to 0.3 µm. When the mean diameter is more than 0.5 µm, a transparency may slightly be deteriorated.

Examples of the inorganic particles include at least one selected from the group consisting of silica, alumina, titania, zeolite, mica, synthetic mica, calcium oxide, zirconium oxide, zinc oxide, magnesium fluoride, smectite, synthetic smectite, vermiculite, ITO (indium oxide/tin oxide), ATO (antimony oxide/tin oxide), tin oxide, indium oxide and antimony oxide.

Examples of the organic particles include at least one selected from the group consisting of acrylic, olefin, polyether, polyester, urethane, polyester, silicone, polysilane, polyimide and fluorine particles.

The composition for forming a high refractive index antiblocking layer according to the present invention is applied and cured to form an antiblocking layer having a microscopic convexoconcave on its surface. A method for applying the composition for forming a high refractive index antiblocking layer may include, for example, a dip coating method, an air knife coating method, a curtain coating method, a roller coating method, a wire bar coating method, a gravure coating method, an extrusion coating method and the like. A thickness of the antiblocking layer may be, for example 0.01 μm to 20 μm.

After applying the composition for forming a high refractive index antiblocking layer, phase separation and curing are generated by irradiation of light. As the irradiation of light, a light having exposure value of, for example, 0.1 to 3.5 J/cm², preferably 0.5 to 1.5 J/cm², may be used. A wavelength region of the irradiation of light is not limited and may appropriately be, for example, not greater than 360 nm. A light with such wavelength can be obtained by a high-pressure mercury lamp, an extra high-pressure mercury lamp and the like.

An Antiblocking Film

The present invention further relates to an antiblocking film obtained by applying the composition for forming a high refractive index antiblocking layer. The antiblocking film has a transparent polymer substrate and an antiblocking layer which is obtained by applying the composition for forming a high refractive index antiblocking layer on the substrate. The antiblocking layer according to the present invention has a technical feature of high refractive index within a range of 1.565 to 1.620, as well as an excellent antiblocking property.

In the antiblocking film according to the present invention, a PET (polyethylene terephthalate) film or a polycarbonate film may preferably be used as the transparent polymer substrate. A PET film and a polycarbonate film may preferably be used as a substrate film for a transparent electrically conducting layer of a touch panel because the films have high film strength and high transparency, and are inexpensive. On the other hand, the films generally have a high refractive index of not less than 1.5. The refractive indexes of the films are higher than refractive indexes of conventional resin components which are used in an antiblocking film. Thus there is a refractive index difference between the films and an antiblocking layer, in which causes a problem of high-frequency appearance of interference fringes.

In this specification, interference fringes mean an iridescence reflection induced by light interference of interface reflections in a multi-laminate which is composed of a transparent film, a transparent coat layer and the like. Especially, the interference fringes tend to be frequently appeared under an irradiation of a three-wavelength region emission fluorescent lamp. The three-wavelength region emission fluorescent lamp is a fluorescent lamp characterized by clear and distinct visibility, in which the three-wavelength region emission fluorescent lamp has enhanced emission intensities at specific wavelengths.

The composition for forming a high refractive index antiblocking layer according to the present invention has a technical feature of providing an antiblocking layer with high refractive index. That is, the present invention has a technical feature of preventing the appearance of interference fringes even if the composition is applied on a transparent polymer film such as a PET film or a polycarbonate film to obtain an antiblocking layer.

On the other hand, the composition for forming a high refractive index antiblocking layer according to the present invention can be applied on another substrate film other than a PET film and a polycarbonate film. Such another substrate film includes, for example, a triacetylcellulose (TAC) film, a diacetylene cellulose film, an acetate butylate cellulose film, a polyethersulfone film, a polyacrylic resin film, a polyurethane resin film, a polyester film, a polysulfone film, a polyether film, a polymethyl pentene film, a polyether ketone film, a (meth)acrylonitrile film and the like.

A thickness of the transparent polymer substrate may appropriately be selected with consideration of use, and may be generally 20 μm to 300 μm.

The antiblocking layer obtained by applying the composition for forming a high refractive index antiblocking layer according to the present invention has a technical feature of having a microscopic convexoconcave. The antiblocking layer may preferably have an arithmetic average roughness (Ra) of less than 0.1 μm, more preferably 0.001 μm to 0.09 μm, most preferably 0.002 μm to 0.08 μm. In this specification, an arithmetic average roughness (Ra) is a parameter defined by JIS (Japanese Industrial Standard) B 0601-2001. When an arithmetic average roughness (Ra) of the antiblocking layer is not less than 0.1 μm, problems of glare and chalking of the layer may occur. When an arithmetic average roughness (Ra) of the antiblocking layer is less than 0.001 μm, it may not be preferable in view of occurrence of blocking. JIS (Japanese Industrial Standard) B 0601-2001 is a standard in conformity with ISO 4288.

An arithmetic average roughness (Ra) is a parameter obtained by followings:
a section of standard length is sampled from its average line on a roughness chart,
the average line is plotted with the average line in the horizontal X axis, and the surface deviation from the average line in the vertical Y axis, and the roughness curve is shown a numerical formula y=f(x), and
the average surface roughness Ra in microns, is calculated by the following formula.

$$Ra = \frac{1}{l} \int_0^l |f(x)| \, dx$$

The antiblocking layer obtained by applying the composition for forming a high refractive index antiblocking layer according to the present invention may preferably have a ten-point average roughness (Rz) of not greater than 0.5 μm. In this specification, a ten-point average roughness (Rz) is a parameter defined by JIS (Japanese Industrial Standard) B 0601-2001. A ten-point average roughness (Rz) may more preferably be not greater than 0.3 μm, most preferably not greater than 0.2 μm. A lower limit of a ten-point average roughness (Rz) may preferably be 0.01 μm.

An arithmetic average roughness (Ra) and a ten-point average roughness (Rz) of the antiblocking layer obtained by applying the composition for forming a high refractive index antiblocking layer according to the present invention can be measured by use of a measuring instrument for micro surface with high accuracy (manufactured by Kosaka Laboratory Ltd.) or a color 3D laser microscope (manufactured by Keyence Corporation), in conformity with JIS (Japanese Industrial Standard) B 0601-2001.

The antiblocking layer obtained by applying the composition for forming a high refractive index antiblocking layer according to the present invention has an irregular, minute and microscopic convezoconcave, which provide an excellent antiblocking property. The antiblocking layer according to the present invention has further technical advantages that the layer does not lower a sharpness of images shown by a light source such as a liquid crystal module and the like. A high definition liquid crystal display device in recent years emits finer beam pitches. Therefore, more minute and microscopic convezoconcave is required in order to keep a sharpness of images. Thanks to minute and microscopic convezoconcave, the antiblocking layer according to the present invention has technical advantages that the layer does not provide lowering of a sharpness of images such as deterioration of contrast, degrading of luminance.

The antiblocking layer according to the present invention has a technical characteristic of having a high refractive index in a range of 1.565 to 1.620, even if the antiblocking layer does not substantially include high refractive index materials. A refractive index of the antiblocking layer can be measured by, for example, an Abbe's refractometer in conformity with JIS (Japanese Industrial Standard) K7142.

The antiblocking film according to the present invention may preferably have a total light transmittance of not less than 85%, more preferably not less than 90%. In addition, the antiblocking film according to the present invention may preferably have a haze value of not greater than 2%, more preferably not greater than 1%. In the present invention, the antiblocking film has a technical characteristic of having high refractive index without including high refractive index materials such as $ZnO$, $TiO_2$, $CeO_2$, $SnO_2$ and $ZrO_2$, and the antiblocking film needs not include such high refractive index materials. Therefore, the present invention can arrive at the above high total light transmittance and low haze value. For more details, a total content of $ZnO$, $TiO_2$, $CeO_2$, $SnO_2$, $ZrO_2$ and indium tin oxide in the composition for forming a high refractive index antiblocking layer may preferably be less than or equal to 0.0001% by mass. When the high refractive index materials such as a metal oxide are included in an antiblocking layer, the antiblocking layer generally has inferior stretchability and bending resistance compared with an antiblocking layer without the high refractive index materials.

A total light transmittance ($T_t(\%)$) is obtained by measuring an incident light intensity ($T_0$) for the antiblocking film and a total transmitted light intensity ($T_1$) through the antiblocking film, and calculating the following formula:

$$Tt\ (\%) = \frac{T1}{T0} \times 100$$

A Haze value is obtained by calculating the following formula, in conformity with JIS (Japanese Industrial Standard) K7105:

$$H\ (\%) = \frac{Td}{Tt} \times 100$$

H: a Haze value (fogging) (%)
$T_d$: a diffuse transmittance (%)
$T_t$: a total light transmittance (%)

Measurement of a total light transmittance and a haze value can be measured by use of, for example, a haze meter (manufactured by Suga Test Instruments Co., Ltd.).

The antiblocking layer obtained by applying the composition for forming a high refractive index antiblocking layer according to the present invention is characterized by having high stretchability, as well as excellent hardness and a high refractive index. Therefore, the antiblocking film according to the present invention is suitable for preparing a film having a transparent electrically conducting layer which is included in, for example, a touch panel.

In various devices having a touch panel, such as mobile phones like smart phones, tablet personal computers or handheld terminal devices, there is a strong demand for downsizing, thinning and lightening. Therefore, in various members including a touch panel electrode, there is a demand for thinning of a substrate film. On the other hand, thinning of a substrate film causes frequent defect appearances of a warp and a curl of a film in case of applying an antiblocking layer on the substrate, in which provides lowering of workability and productivity. These defects seem to result from a difference of physical performances such as thermal shrinkage and thermal expansion between an antiblocking layer and a substrate film. The antiblocking film according to the present invention tends to have decreased curl for various substrates because of excellent stretchability of the antiblocking film.

On the antiblocking film according to the present invention, various functional layers such as a transparent electrically conducting layer, an optical interference layer for controlling reflectance by an optical interference may optionally be applied in an optional and appropriate order. An applying order of these transparent electrically conducting layer, optical interference layer and antiblocking layer with a high refractive index are not limited as long as these layers demonstrate desired functionalities for their purposes. In a touch panel, embodiments of their applying orders may, for example, be the followings, wherein a transparent electrically conducting layer is denoted as "A", an optical interference layer is denoted as "B", the antiblocking layer with a high refractive index according to the present invention is denoted as "C", a transparent polymer substrate is denoted as "D", an antiblocking layer out of the present invention is denoted as "E": A/B/C/D/E, A/B/C/D/C, A/B/B/C/D/E, A/B/B/C/D/C, A/C/D/E/B, A/C/D/C/B, A/C/D/E/B/B, A/C/D/C/B/B, and the like.

The above optical interference layer means a layer for preventing or controlling reflected light in combination with a high refractive index layer and a low refractive index layer appropriately. The optical interference layer comprises at least one high refractive index layer and at least one low refractive index layer. The optical interference layer may comprise two or more combination units of a high refractive index layer and a low refractive index layer. When the optical interference layer is composed of one high refractive index layer and one low refractive index layer, the optical interference layer may preferably have a thickness of 30 nm to 150 nm, more preferably 50 nm to 150 nm. The optical interference layer may be applied by a wet process or a dry process. A wet process may be, for example, a doctor knife method, bar coater method, a gravure roll coater method, a curtain coater method, a knife coater method, a spin coater method, a spray method, a dipping method or the like. A dry process may be, for example, a physical vapor deposition (PVD) such as a sputtering method, a vacuum deposition method, an ion plating method and the like; a printing process; or a chemical vapor deposition (CVD).

A transparent electroconductive laminate included in a touch panel and the like is generally a film having a transparent electrically conducting layer. The transparent electrically conducting layer is not limited and may preferably be a crystalline layer containing indium oxide, for more details, a crystalline layer containing indium ingredient such as indium tin oxide (ITO) and indium zinc oxide (IZO) as a major ingredient. The transparent electrically conducting layer may be applied by a physical vapor deposition (PVD) such as a sputtering method, a vacuum deposition method, an ion plating method and the like; a coating process; a printing process; or a chemical vapor deposition (CVD), preferably a physical vapor deposition (PVD) or a chemical vapor deposition (CVD).

In a processing for applying a transparent electrically conducting layer, a substrate film having an antiblocking layer is exposed a partial load. The partial load may cause a kink of a film which results from a difference of thermal shrinkage and thermal expansion of a transparent electrically conducting layer, an antiblocking layer and a substrate film in a transparent electroconductive laminate. The antiblocking layer obtained by applying the composition for forming a high refractive index antiblocking layer according to the present invention has a technical characteristic of having high stretchability, as well as excellent hardness and a high refractive index. Therefore, even if a substrate film is exposed a partial thermal load such as heating at a stage of applying a transparent electrically conducting layer and obtains a partial thermal expansion, the antiblocking film according to the present invention has advantages such as decreased kink because of an excellent stretchability of the antiblocking layer and accompanying followings of the antiblocking layer.

As for stretchability of the antiblocking layer, for more details, in case that a substrate for applying the composition for forming a high refractive index antiblocking layer is a PET film having a thickness within a range of 20 to 300 μm, the antiblocking film may have a characteristic that the antiblocking layer has no crack in which the antiblocking film is elongated by 15% in a machine direction at a tension rate of 5 mm/second. In that case, the antiblocking layer may have a thickness of, for example, 0.05 μm to 10 μm.

Polymer substrate films are generally manufactured by a biaxial orientation method, in which a resin material in a molten state is wound in a roll, under two direction extension of a machine direction (in the direction of winding: MD direction) and a transverse direction (intersecting the direction of winding almost perpendicularly: TD direction), to obtain a film having uniform thickness. In the manufacturing method, the resulting film has higher stress in MD direction. Therefore, the resulting film tends to generate a thermal expansion and a thermal contraction in MD direction. By means of a film test of the resulting antiblocking film by elongating in a machine direction, that is, in the wound direction under winding of manufacturing the polymer substrate film, there is an advantage that a practical test of cracking (fissures of a film) can be performed.

In case that a transparent polymer substrate of an antiblocking film is a polycarbonate film, a bending resistance test of an antiblocking film can be evaluated as stretchability of resulting antiblocking layer. Polycarbonates are materials having excellent physical properties such as heat resistance and impact resistance. On the other hand, in case those polycarbonates are in a form of thin film, the film sometimes obtains cracking (fissures of a film) by a stress such as folding. When a polycarbonate film having thin thickness is used as a substrate film, a high stretchability of an antiblocking layer applied on the substrate film can prevent occurrence of cracking or the substrate film by applying the antiblocking layer onto the substrate film. The antiblocking layer obtained by the hard coating composition according to the present invention has high stretchability. Therefore, applying the antiblocking layer according to the present invention on such thin thickness polycarbonate film which is used as a substrate film can improve a toughness against folding stress and is advantageous. For more details, in case that a substrate for applying the composition for forming a high refractive index antiblocking layer is a polycarbonate film having a thickness within a range of 30 μm to 200 μm, the antiblocking film may have a characteristic that both of the antiblocking layer and the substrate have no crack in which the antiblocking film is bent at a 180 degree-angle under a condition of 25° C. and 60 degree/second. In that case, the antiblocking layer may have a thickness of, for example, 0.05 μm to 10 μm.

The antiblocking layer obtained by applying the composition for forming a high refractive index antiblocking layer according to the present invention has a technical characteristic of having high visibility and stretchability, as well as an excellent antiblocking property and hardness. The antiblocking layer obtained from the composition for forming a high refractive index antiblocking layer according to the present invention has a technical feature of having high refractive index. That is, the present invention has a technical feature of preventing the appearance of interference fringes even if the composition for forming a high refractive index antiblocking layer is applied on a high refractive index polymer film such as a PET film or a polycarbonate film to obtain the antiblocking layer according to the present invention. Therefore, the antiblocking layer according to the present invention is suitable for preparing a film having a transparent electrically conducting layer which is included in, especially, a touch panel.

EXAMPLES

The present invention will be further explained in detail in accordance with the following examples, but it is not construed as limiting the present invention to these examples. In the examples, "part" and "%" are based on mass unless otherwise specified.

Production Example 1: Production of a Phenolic Novolac Acrylate (1)

A reaction vessel equipped with a stirrer, a thermometer, a dropping funnel and a reflux apparatus was charged with a mixture of 150 g of phenol novolac resin (a weight average molecular weight of 700 to 900, an epoxy equivalent of 150 to 200) and 550 g of epichlorohydrin, and 110 g of an aqueous solution of sodium hydroxide (48.5%) was added dropwise for 2 hours under a temperature of 100° C. and a reduced pressure of 100 to 200 mmHg.

After the reaction was finished, a reaction temperature of the reaction mixture was lowered to a room temperature, and excess amounts of an aqueous solution of sodium hydroxide were neutralized with an acid, then the reaction mixture was heated under a reduced pressure to remove excess amounts of epichlorohydrin.

Next, the resulting reaction mixture was dissolved in methyl isobutyl ketone, and a salt of byproduct was removed by water filtration to obtain a solution of phenol novolac epoxy resin.

To the resulting phenol novolac epoxy resin (solid contents: 100 parts by mass), 1000 ppm of methoquinone (hydroquinone monomethylether) and 2000 ppm of triphenylphosphine were added, and acrylic acid was added dropwise under a temperature of 100° C. so as to an acid value of the resulting resin became not greater than 1 mg KOH/g, to obtain a phenolic novolac epoxy acrylate (1). The obtained phenolic novolac epoxy acrylate (1) had a weight average molecular weight of 950, a hydroxyl value of 140 mgKOH/g, a refractive index of 1.572, and a SP value of 12.7.

Production Example 2: Production of a Phenolic Novolac Acrylate (2)

A reaction vessel equipped with a stirrer, a thermometer, a dropping funnel and a reflux apparatus was charged with a mixture of 150 g of phenol novolac resin (a weight average molecular weight of 900 to 1100, an epoxy equivalent of 150 to 200) and 550 g of epichlorohydrin, and 110 g of an aqueous solution of sodium hydroxide (48.5%) was added dropwise for 2 hours under a temperature of 100° C. and a reduced pressure of 100 to 200 mmHg.

After the reaction was finished, a reaction temperature of the reaction mixture was lowered to a room temperature, and excess amounts of an aqueous solution of sodium hydroxide were neutralized with an acid, then the reaction mixture was heated under a reduced pressure to remove excess amounts of epichlorohydrin.

Next, the resulting reaction mixture was dissolved in methyl isobutyl ketone, and a salt of byproduct was removed by water filtration to obtain a solution of phenol novolac epoxy resin.

To the resulting phenol novolac epoxy resin (solid contents: 100 parts by mass), 1000 ppm of methoquinone (hydroquinone monomethylether) and 2000 ppm of triphenylphosphine were added, and acrylic acid was added dropwise under a temperature of 100° C. so as to an acid value of the resulting resin became not greater than 1 mg KOH/g, to obtain a phenolic novolac epoxy acrylate (2). The obtained phenolic novolac epoxy acrylate (2) had a weight average molecular weight of 1200, a hydroxyl value of 137 mgKOH/g, a refractive index of 1.571, and a SP value of 12.6.

Example E1

A hard coating composition was prepared by using the phenolic novolac epoxy acrylate (1) obtained by Production example 1 as a component (A) and an ethoxylated orthophenylphenol acrylate (an acrylate having 1 mol of ethylene oxide structure, a viscosity at 25° C. of 130 mPa·s and a refractive index of 1.577) as a component (B). Raw materials shown in Table 1 were mixed in the solid amounts shown in Table 1, and were stirred to obtain a hard coating composition.

The viscosity at 25° C. of the component (B), the ethoxylated orthophenylphenol acrylate, was measured by a B-type viscometer (TVB-22L, manufactured by Toki Sangyo co., ltd.) and a M1 Rotor at a number of rotations of 60 rpm after 10 ml of the component (B), the ethoxylated orthophenylphenol acrylate, was sampled in a container as a test sample and was kept under a temperature of 20° C. The refractive index of the component (B) was measured by an Abbe's refractometer in conformity with JIS (Japanese Industrial Standard) K0062.

The resulting hard coating composition was dropped on an optical PET film (trade name KEFW, manufactured by Teijin DePont Films Japan Limited, 188 μm) and was coated with a bar coater #12.

After the coating, the resulting coat was dried at 70° C. for one minute and was irradiated by ultraviolet rays of 350 mJ with a ultraviolet ray irradiator (manufactured by Fusion) to obtain a hard coat film composed of the PET film and a hard coat layer having a thickness of 6.5 μm.

In addition, the resulting hard coating composition was dropped on an optical PC film (trade name Pureace, manufactured by Teifin Limited, 100 μm) and was coated with a bar coater #9.

After the coating, the resulting coat was dried at 70° C. for one minute and was irradiated by ultraviolet rays of 350 mJ with a ultraviolet ray irradiator (manufactured by Fusion) to obtain a hard coat film composed of the polycarbonate film and a hard coat layer having a thickness of 5.0 μm.

Examples E2 to E5

Hard coating compositions were prepared in the same manner as in Example E1 except that types and/or amounts of a component (A) were changed as shown in Table 1 and pentaerythritol triacrylate was used as an another (meth) acrylate. Using the resulting hard coating compositions, two types of hard coat films were prepared respectively in the same manner as in Example E1.

Comparative Examples E1 to E5, E9

Hard coating compositions were prepared in the same manner as in the examples except that in accordance with the amounts as shown in Table 2.

Using the resulting hard coating compositions, two types of hard coat films were prepared respectively in the same manner as in Example E1.

Comparative Examples E6, E10

Hard coating compositions were prepared in the same manner as in the examples except that in accordance with the amounts as shown in Table 2.

The resulting hard coating composition was dropped on an optical PET film (trade name KEFW, manufactured by Teijin DePont Films Japan Limited, 188 μm) and was coated with a bar coater #13.

After the coating, the resulting coat was dried at 70° C. for one minute and was irradiated by ultraviolet rays of 350 mJ with a ultraviolet ray irradiator (manufactured by Fusion) to obtain a hard coat film composed of the PET film and a hard coat layer having a thickness of 6.5 μm.

In addition, the resulting hard coating composition was dropped on an optical PC film (trade name Pureace, manufactured by Teijin Limited, 100 μm) and was coated with a bar coater #10.

After the coating, the resulting coat was dried at 70° C. for one minute and was irradiated by ultraviolet rays of 350 mJ with a ultraviolet ray irradiator (manufactured by Fusion) to obtain a hard coat film composed of the polycarbonate film and a hard coat layer having a thickness of 5.0 μm.

Comparative Examples E7, E11

Hard coating compositions were prepared in the same manner as in the examples except that in accordance with the amounts as shown in Table 2.

The resulting hard coating composition was dropped on an optical PET film (trade name KEFW, manufactured by Teijin DePont Films Japan Limited, 188 μm) and was coated with a bar coater #16.

After the coating, the resulting coat was dried at 70° C. for one minute and was irradiated by ultraviolet rays of 350 mJ with a ultraviolet ray irradiator (manufactured by Fusion) to obtain a hard coat film composed of the PET film and a hard coat layer having a thickness of 6.5 μm.

In addition, the resulting hard coating composition was dropped on an optical PC film (trade name Pureace, manufactured by Teijin Limited, 100 μm) and was coated with a bar coater #12.

After the coating, the resulting coat was dried at 70° C. for one minute and was irradiated by ultraviolet rays of 350 mJ with a ultraviolet ray irradiator (manufactured by Fusion) to obtain a hard coat film composed of the polycarbonate film and a hard coat layer having a thickness of 5.0 μm.

Comparative Examples E8, E12, E13

Hard coating compositions were prepared in the same manner as in the examples except that in accordance with the amounts as shown in Table 2.

The resulting hard coating composition was dropped on an optical PET film (trade name KEFW, manufactured by Teijin DePont Films Japan Limited, 188 μm) and was coated with a bar coater #20.

After the coating, the resulting coat was dried at 70° C. for one minute and was irradiated by ultraviolet rays of 350 mJ with an ultraviolet ray irradiator (manufactured by Fusion).

In case of the hard coating composition of Comparative example E12, a hard coat film composed of the PET film and a hard coat layer having a thickness of 6.5 μm was obtained. However, in case of the hard coating compositions of Comparative examples E8 and E13, hard coating films were not obtained because hard coating compositions were not cured.

In addition, the resulting hard coating composition was dropped on an optical PC film (trade name Pureace, manufactured by Teijin Limited, 100 μm) and was coated with a bar coater #14.

After the coating, the resulting coat was dried at 70° C. for one minute and was irradiated by ultraviolet rays of 350 mJ with an ultraviolet ray irradiator (manufactured by Fusion).

In case of the hard coating composition of Comparative example E12, a hard coat film composed of the polycarbonate film and a hard coat layer having a thickness of 5.0 μm was obtained.

However, in case of the hard coating compositions of Comparative examples E8 and E13, hard coating films were not obtained because hard coating compositions were not cured.

Examples E1 to E6

On the hard coat film obtained Example 1, an ITO layer was formed on the cured hard coat layer by a sputtering method in use of indium oxide-tin oxide target with a density of arrangement of 98% containing indium oxide and tin oxide with a mass ratio of 95:5, to obtain a transparent electroconductive laminate which is used as a movable electrode substrate.

A thickness of the resulting TIO layer was about 30 nm, and a surface electrical resistance after formation of the layer was about 150 Ω/sq.

From the resulting transparent electroconductive laminate, interference fringes were not visually observed.

In use of hard coat films obtained by the above Examples E1 to E5 and Comparative examples E1 to E13, the following tests were examined. Obtained test results were shown in Tables 1 and 2.

Measurement of Refractive Index

An refractive index was measured by an Abbe's refractometer (2T manufactured by Atago Co., Ltd., measuring range nD of 1.3 to 1.7) under the following procedures.

On a main prism, an intermediate liquid (e.g., monobromo-monaphthalene) was dropped one drop by use of a dropper, then a measuring sample was placed. The intermediate liquid was dropped one drop on the sample by use of a dropper, then a sub prism was closed. In this stage, it was required that an air was not present in the intermediate liquid layer.

An incident lamp light was entered into the sub prism, a measuring knob was turned under viewing through an eyepiece to adjust a brightness boundary line of refractive index viewing to an intersection point, a value of a graduation viewing was read to the forth decimal place, to obtain a refractive index.

Evaluation of Hardness

A hardness was measured by using a pencil scratch coating film hardness test apparatus (P model manufactured by Toyo Seiki Seisaku-sho, Ltd., a load pressure of 100 g to 1 kg). A pencil for use in a pencil scratch test manufactured by Mitsubishi Pencil Co., Ltd. (approved by Japan Paint Inspection and Testing Association) was used in the measurement.

The pencil was conditioned with a sandpaper (P-1000 manufactured by 3M) so that a tip of its core had smooth and circular section.

A sample was placed on a measurement stage and the pencil was fixed at a scratch angle of 45°, then a measurement was performed under a load of 750 g.

Conditioning of core smoothing was performed at every measurement, and a measurement was performed five times to move another location of the measurement point.

Presence of a dent on a coating film was visually evaluated based on the evaluation standard described below.

In case of using a 2H pencil, a sample is evaluated as 2H in case that no dent is observed.

In case that one or two dent is observed, additional tests are performed in use of a pencil with one rank lower grade (H). In case that no dent is observed by using a pencil with one rank lower grade (H), a sample is evaluated as an intermediate range (H to 2H).

In case that three or more dent is observed, a sample is evaluated as under H, and a similar evaluation is performed by using a pencil with one rank lower grade.

A hardness of a PET film used in a production of coating films is within a range of HB to F, and a hardness of a polycarbonate (PC) film in a production of coating films is within a range of 5B to 4B.

In case that a hardness of a hard coat film having a PET film and a hard coat layer is H or higher than H, the hard coat layer is evaluated as efficient hardness because the hard coat layer provides two rank upper grade or more.

In case that a hardness of a hard coat film having a polycarbonate film and a hard coat layer is 3B or higher than 3B, the hard coat layer is evaluated as efficient hardness because the hard coat layer provides two rank upper grade or more.

Evaluation of Elongation

An elongation percentage was measured by an autograph (AG-1S, manufactured by Shimadzu Corporation). A test sample was cut to the size of 10 mm by 150 mm, then each ends of the resulting test sample was fixed by upper or lower chuck of the measuring apparatus in a direction of longer direction elongation. The test sample was elongated at the rate of 2 cm per second under room temperature (20° C.) to obtain an elongation percentage in which a break or crack does not occur.

Measurement of Bending Resistance

A test sample was prepared in the size of 50 mm by 50 mm, then the test sample was bent at a 180 degree-angle. The test sample was visually observed under the following evaluation criteria.
○: no crack is observed in either a coat layer or a substrate.
Δ: crack is observed only in a substrate.
x: crack is observed in both of a coat layer and a substrate.

Evaluation Method of Interference Fringes Interference Fringes (Appearance Evaluation)

A test sample was affixed on a black acrylic plate with the size of 100 mm by 100 mm by use of an adhesive for optical film use to appear a coat layer of the test sample on the surface. A stand-type three-wavelength fluorescent light (SLH-399 model manufactured by Twinbird Corporation) was placed, and the test sample was placed perpendicularly below the fluorescent light in the distance between the light and the test sample being 10 cm, then the test sample was visually observed. As for a test sample having good evaluation result (○), a visual observation under the sunlight was performed. The resulting test results were determined under the following evaluation criteria.
⊚: no interference fringes (interference pattern) are observed under either the three-wavelength fluorescent light or the sunlight.
○: no interference fringes (interference pattern) are observed under the three-wavelength fluorescent light, however a slight interference fringes were observed under the sunlight.
Δ: slight interference fringes (interference pattern) are observed.
x: interference fringes (interference pattern) are clearly observed.

Interference Fringes (Transmission Spectrum Amplitude)

A light transmittance of a test sample was measured by an ultraviolet and visible spectrophotometer (UV-2450 manufactured by Shimadzu Corporation). As for amplitude of transmittance within a range of 500 to 750 nm, the test results were determined under the following evaluation criteria.
○: a difference between a greatest value of transmittance and a minimum value of transmittance is less than 0.5%.
Δ: a difference between a greatest value of transmittance and a minimum value of transmittance is not less than 0.5% and less than 1.0%.
x: a difference between a greatest value of transmittance and a minimum value of transmittance is not less than 1.0%.

TABLE 1

| | | EXAMPLES | | | | |
|---|---|---|---|---|---|---|
| | | E1 | E2 | E3 | E4 | E5 |
| | Phenol novolac epoxy acrylate (1) | 85.00 | 60.00 | | 60.00 | 72.50 |
| | Phenol novolac epoxy acrylate (2) | | | 60.00 | | |
| | Ethoxylated orthophenylphenol acrylate | 15.00 | 15.00 | 15.00 | 30.00 | 22.50 |
| | Pentaerythritol triacrylate | | 25.00 | 25.00 | 10.00 | 5.00 |
| | I-184 | 5.00 | 5.00 | 5.00 | 5.00 | 5.00 |
| | Bisphenol A ethyleneoxide-modified (2 mol) diacrylate | | | | | |
| | Acryloyl morpholine | | | | | |
| | High refractive index filler 1 (zirconia: ZRMIBK30WT %) | | | | | |
| | High refractive index filler 2 (titania: TiMIBK15WT %) | | | | | |
| | Bifunctional urethane acrylate (NV100: CN-9893) | | | | | |
| | Methyl isobutyl ketone | 21.25 | 15.00 | 15.00 | 15.00 | 18.13 |
| | Isobutyl alcohol | 53.54 | 56.67 | 56.67 | 56.67 | 55.10 |
| | Butyl acetate | 53.54 | 56.67 | 56.67 | 56.67 | 55.10 |
| | Total amounts | 233.33 | 233.33 | 233.33 | 233.33 | 233.33 |
| | A refractive index of a hard coat layer | 1.5825 | 1.5710 | 1.5709 | 1.5813 | 1.5815 |
| 125 μm | Hardness | H | H~2H | H~2H | H | H |
| PET | Elongation | 40% | 15% | 15% | 30% | 30% |
| 6.5 μm coating | Interference fringes (appearance evaluation) | ○ | ○ | ○ | ○ | ○ |
| | Interference fringes (transmission spectrum amplitude) | ○ | ○ | ○ | ○ | ○ |
| 100 μm | Hardness | 2B | 2B~B | 2B~B | 2B | 2B |
| PC | bending resistance | ○ | ○ | ○ | ○ | ○ |
| 5 μm coating | Interference fringes (appearance evaluation) | ⊚ | ⊚ | ⊚ | ⊚ | ⊚ |
| | Interference fringes (transmission spectrum amplitude) | ○ | ○ | ○ | ○ | ○ |

TABLE 2

| | COMPARATIVE EXAMPLES | | | | | | |
|---|---|---|---|---|---|---|---|
| | E1 | E2 | E3 | E4 | E5 | E6 | E7 |
| Phenol novolac epoxy acrylate (1) | 95.00 | 55.00 | | 60.00 | | | |
| Phenol novolac epoxy acrylate (2) | | | | | | | |
| Ethoxylated orthophenylphenol acrylate | 5.00 | 45.00 | 15.00 | | | | |
| Pentaerythritol triacrylate | | | | 25.00 | 60.00 | 40.00 | 60.00 |

TABLE 2-continued

|  |  |  |  |  |  |  |  |  |
|---|---|---|---|---|---|---|---|---|
|  | I-184 | 5.00 | 5.00 | 5.00 | 5.00 | 5.00 | 5.00 | 5.00 |
|  | Bisphenol A ethyleneoxide-modified (2 mol) diacrylate |  |  | 85.00 |  |  |  |  |
|  | Acryloyl morpholine |  |  |  | 15.00 |  |  |  |
|  | High refractive index filler 1 (zirconia: ZRMI8K30WT %) |  |  |  |  |  | 40.00 | 60.00 |
|  | High refractive index filler 2 (titania: TiMIBK15WT %) |  |  |  |  |  |  | 40.00 |
|  | Bifunctional urethane acrylate (NV100: CN-9893) |  |  |  |  |  |  |  |
|  | Methyl isobutyl ketone | 23.75 | 13.75 |  | 15.00 | 93.33 | 140.00 | 226.67 |
|  | Isobutyl alcohol | 52.29 | 57.29 | 64.17 | 56.67 | 17.50 | 8.75 | 9.17 |
|  | Butyl acetate | 52.29 | 57.29 | 64.17 | 56.67 | 17.50 | 8.75 | 9.17 |
|  | Total amounts | 233.33 | 233.33 | 233.33 | 233.33 | 233.33 | 262.50 | 350.00 |
|  | A refractive index of a hard coat layer | 1.5785 | 1.5810 | 1.5649 | 1.5597 | 1.5850 | 1.6263 | 1.6150 |
| 125 μm PET 6.5 μm coating | Hardness | F~H | HB | B | H | 2~3H | 2~3H | H~2H |
|  | Elongation | 30% | 40% | 40% | <15% | <15% | <15% | <15% |
|  | Interference fringes (appearance evaluation) | ○ | ○ | X | X | X | X | X |
|  | Interference fringes (transmission spectrum amplitude) | ○ | ○ | ○ | ○ | Δ | Δ | X |
| 100 μm PC 5 μm coating | Hardness | 3~2B | 4B | 5B | 2B | B | B | 2B~B |
|  | bending resistance | ○ | ○ | ○ | Δ | X | X | X |
|  | Interference fringes (appearance evaluation) | ◎ | ◎ | ◎ | ○ | X | X | X |
|  | Interference fringes (transmission spectrum amplitude) | ○ | ○ | ○ | ○ | Δ | X | X |

|  |  | COMPARATIVE EXAMPLES | | | | | |
|---|---|---|---|---|---|---|---|
|  |  | E8 | E9 | E10 | E11 | E12 | E13 |
|  | Phenol novolac epoxy acrylate (1) |  |  |  |  |  |  |
|  | Phenol novolac epoxy acrylate (2) |  |  |  |  |  |  |
|  | Ethoxylated orthophenylphenol acrylate |  |  |  |  |  |  |
|  | Pentaerythritol triacrylate | 40.00 | 40.00 | 24.00 | 16.00 | 24.00 | 16.00 |
|  | I-184 | 5.00 | 5.00 | 5.00 | 5.00 | 5.00 | 5.00 |
|  | Bisphenol A ethyleneoxide-modified (2 mol) diacrylate |  |  |  |  |  |  |
|  | Acryloyl morpholine |  |  |  |  |  |  |
|  | High refractive index filler 1 (zirconia: ZRMI8K30WT %) |  |  | 40.00 | 60.00 |  |  |
|  | High refractive index filler 2 (titania: TiMIBK15WT %) | 60.00 |  |  |  | 40.00 | 60.00 |
|  | Bifunctional urethane acrylate (NV100: CN-9893) |  | 60.00 | 36.00 | 24.00 | 36.00 | 24.00 |
|  | Methyl isobutyl ketone | 340.00 | 60.00 | 129.33 | 164.00 | 262.67 | 364.00 |
|  | Isobutyl alcohol | 40.00 | 34.17 | 14.08 | 40.50 | 78.67 | 28.00 |
|  | Butyl acetate | 40.00 | 34.17 | 14.08 | 40.50 | 78.67 | 28.00 |
|  | Total amounts | 525.00 | 233.33 | 262.50 | 350.00 | 525.00 | 525.00 |
|  | A refractive index of a hard coat layer | — | 1.5098 | 1.5843 | 1.6261 | 1.6142 | — |
| 125 μm PET 6.5 μm coating | Hardness | — | H | H~2H | H~2H | F | — |
|  | Elongation | — | 20% | <15% | <15% | 20% | — |
|  | Interference fringes (appearance evaluation) | — | X | X | X | X | — |
|  | Interference fringes (transmission spectrum amplitude) | — | X | X | X | X | — |
| 100 μm PC 5 μm coating | Hardness | — | 2B | 2B~B | 2B~B | 3B | — |
|  | bending resistance | — | ○ | X | X | ○ | — |
|  | Interference fringes (appearance evaluation) | — | X | X | X | X | — |
|  | Interference fringes (transmission spectrum amplitude) | — | X | X | X | X | — |

In the Table 1 and Table 2, each term means as follows.

I-184: 1-hydroxycyclohexyl phenyl ketone, a photoinitiator.

Bisphenol A ethyleneoxide-modified (2 mol) diacrylate: Aronix M-211B manufactured by Toa gosei Co., Ltd., bisphenol A ethyleneoxide-modified, (2 mol) diacrylate.

High refractive index filler 1: zirconia: ZRMIBK30WT %, zirconium oxide, manufactured by CIK NanoTec.

High refractive index filler 2: titania: TiMIBK15WT %, titanium oxides, manufactured by CIK NanoTec.

Bifunctional urethane acrylate: NV (non-volatile component) 100, CN-9893 manufactured by Sartomer Corp.

Each of the hard coat films having the hard coat layer obtained by the hard coating composition of the Examples had a high refractive index and excellent hardness without interference fringes. In addition, each of the obtained hard coat films of the Examples had an excellent elongation and an excellent bending resistance.

Comparative examples E1 and E2 were a comparative example in which an amount of the component (B) was out of the claimed invention of the present application. In each of these comparative examples, the obtained coat film had a defect of inferior hardness.

Comparative example E3 was a comparative example in which bisphenol A diacrylate was used in place of the component (A). In the comparative example, the obtained coat film had a lower refractive index and was observed appearance of interference fringes. In addition, the obtained coat film had a defect of inferior hardness.

Comparative example E4 was a comparative example in which acryloyl morpholine was used in place of the component (B). In the comparative example, the obtained coat film also had a lower refractive index and was observed appearance of interference fringes. In addition, the obtained coat film had an inferior elongation.

Comparative examples E5 to E8 were comparative examples in which zirconium oxide or titanium oxides were used as a high refractive index material, in place of using the components (A) and (B). In the comparative examples, the obtained coat films had excellent hardness, however had a significantly lower elongation. The coating composition of comparative example E8 could not provide a cured coat layer.

Comparative examples E9 to E13 were comparative examples in which a bifunctional urethane acrylate was used in order to provide an elongation to a hard coat layer. Some of these comparative examples had a slightly-increased elongation. However, performance balancing of a hardness and a refractive index was deteriorated in these comparative examples. The coating composition of comparative example E13 could not provide a cured coat layer.

The coating compositions of Comparative examples E5 to E13 included high refractive index fillers. Including high refractive index fillers provided indeed a high refractive index of the obtaining hard coat layer. On the other hand, each the obtaining hard coat layer of the comparative examples was observed appearance of interference fringes. The reason why the comparative examples had appearance of interference fringes seems to be a mixture of resin components having lower refractive indexes which form a hard coat layer and high refractive index fillers which exist between the resin components. The constitution seems to provide inferior prevention of appearance of interference fringes because of a bad influence of the resin components' lower refractive indexes, even if a refractive index itself of a hard coat layer is high. In addition, the experimental results of Examples and Comparative examples show that the hard coat layer according to the present invention has excellent prevention effect of appearance of interference fringes.

FIG. 1 is a graphical chart showing a transmission spectrum (transmittance %) within a wavelength range of 400 to 800 nm of a hard coat layer obtained by the hard coating composition of Example E1.

Figure 2:
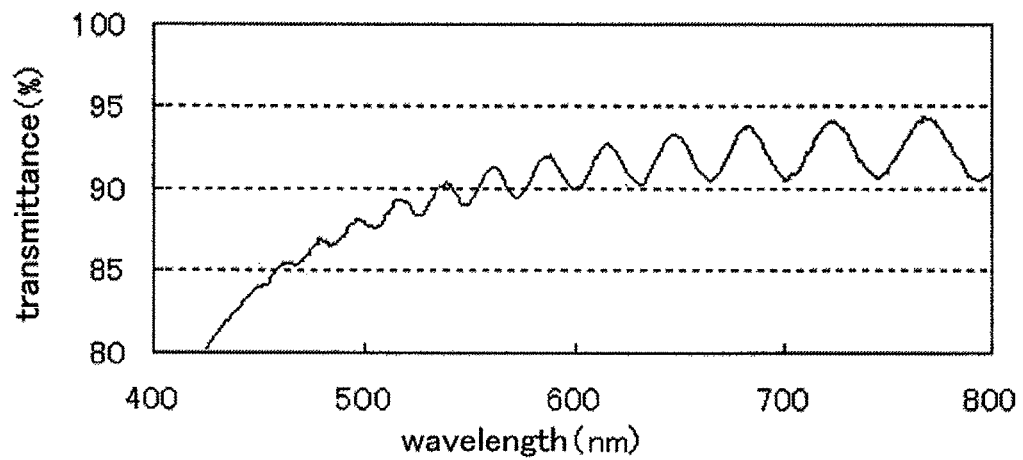
FIG. 2 is a graphical chart showing a transmission spectrum (transmittance) within a wavelength range of 400 nm to 800 nm of a hard coat layer obtained by the hard coating composition of Comparative Example E10.

FIG. 2 is a graphical chart showing a transmission spectrum (transmittance %) within a wavelength range of 400 to 800 nm of a hard coat layer obtained by the hard coating composition of Comparative Example E10.

As shown in the transmission spectrums of FIGS. 1 and 2, a hard coat layer obtained by the example according to the present invention has extremely narrow amplitude in the transmission spectrum. The result clearly shows that the hard coat layer has little optical blurring in visible wavelength. On the other hand, a hard coat layer obtained by Comparative example E10 has large amplitude in the transmission spectrum. The result clearly shows that the hard coat layer has large optical blurring in visible wavelength. As shown in the transmission spectrums, technical effects of the present invention can be understandable.

Example F1

A hard coating composition was prepared by using the Phenolic novolac epoxy acrylate (1) obtained by Production example 1 as a component (A), an ethoxylated orthophenylphenol acrylate (an acrylate having 1 mol of ethylene oxide structure, a viscosity at 25° C. of 130 mPa·s and a refractive index of 1.577) as a Component (B) and Ogsol EA-0200 (a fluorene unit-containing acrylate available from Osaka Gas Chemicals Co., Ltd., represented by the following formula (II)-1,

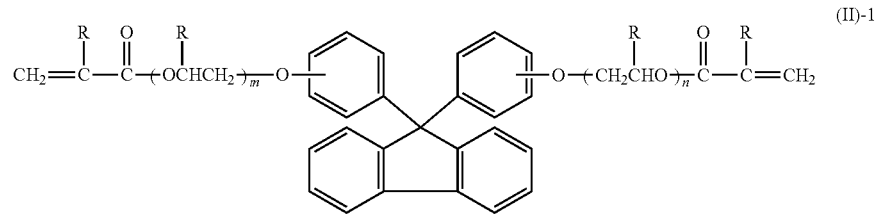

wherein each of R represents H, and m+n=2) as a component (C).

Raw materials shown in Table 3 were mixed in the solid amounts shown in Table 3, and were stirred to obtain a hard coating composition. The viscosity at 25° C. of the component (B), the ethoxylated orthophenylphenol acrylate, was measured by a B-type viscometer (TVB-22L, manufactured by Toki Sangyo co., ltd.) and a M1 Rotor at a number of rotations of 60 rpm after 10 ml of the component (B), the ethoxylated orthophenylphenol acrylate, was sampled in a container as a test sample and was kept under a temperature of 20° C. The refractive index of the component (B) was measured by an Abbe's refractometer in conformity with JIS (Japanese Industrial Standard) K0062.

The resulting hard coating composition was dropped on an optical PET film (trade name KEFW, manufactured by Teijin DePont Films Japan Limited, 188 μm) and was coated with a bar coater #12.

After the coating, the resulting coat was dried at 70° C. for one minute and was irradiated by ultraviolet rays of 350 mJ with a ultraviolet ray irradiator (manufactured by Fusion) to obtain a hard coat film composed of the PET film and a hard coat layer having a thickness of 6.5 μm.

In addition, the resulting hard coating composition was dropped on an optical PC film (trade name Pureace, manufactured by Teijin Limited, 100 μm) and was coated with a bar coater #9.

After the coating, the resulting coat was dried at 70° C. for one minute and was irradiated by ultraviolet rays of 350 mJ with a ultraviolet ray irradiator (manufactured by Fusion) to obtain a hard coat film composed of the polycarbonate film and a hard coat layer having a thickness of 5.0 μm.

Examples F2 to F4

Hard coating compositions were prepared in the same manner as in Example F1 except that types and/or amounts of a component (A) were changed as shown in Table 3 and pentaerythritol triacrylate was used as an another (meth) acrylate. Using the resulting hard coating compositions, two types of hard coat films were prepared respectively in the same manner as in Example F1. In Example F4, Ogsol EA-F5503 (available from Osaka Gas Chemicals Co., Ltd.) was used as a component (C).

Comparative Examples F1 and F2

Hard coating compositions were prepared in the same manner as in the examples except that in accordance with the amounts as shown in Table 4. Using the resulting hard coating compositions, two types of hard coat films were prepared respectively in the same manner as in Example F1.

Example F5

On the cured coat layer of the hard coat film obtained by Example F1, an ITO layer was formed by a sputtering method in use of indium oxide-tin oxide target with a density of arrangement of 98% containing indium oxide and tin oxide with a mass ratio of 95:5, to obtain a transparent electroconductive laminate which is used as a movable electrode substrate. A thickness of the resulting TIO layer was about 30 nm, and a surface electrical resistance after formation of the layer was about 150 Ω/sq. From the resulting transparent electroconductive laminate, interference fringes were not visually observed.

In use of hard coat films obtained by the above Examples F1 to F4 and Comparative examples F1 and F2, the above-mentioned tests in Example E6 were examined. Obtained test results were shown in Tables 3 and 4.

TABLE 3

| | | EXAMPLES | | | |
|---|---|---|---|---|---|
| | | F1 | F2 | F3 | F4 |
| | Phenol novolac epoxy acrylate (1) | 70.00 | 40.00 | 50.00 | 50.00 |
| | Phenol novolac epoxy acrylate (2) | | | | |
| | Ethoxylated orthophenylphenol acrylate | 15.00 | 20.00 | 22.50 | 22.50 |
| | Ogsol EA-0200 | 15.00 | 40.00 | 27.50 | |
| | Ogsol EA-F5503 | | | | 27.50 |
| | Pentaerythritol triacrylate | | | | |
| | I-184 | 5.00 | 5.00 | 5.00 | 5.00 |
| | Bisphenol A ethyleneoxide-modified (2 mol) diacrylate | | | | |
| | Acryloyl morpholine | | | | |
| | High refractive index filler 1 (zirconia: ZRMIBK30WT %) | | | | |
| | High refractive index filler 2 (titania: TiMIBK15WT %) | | | | |
| | Bifunctional urethane acrylate (NV100: CN-9893) | | | | |
| | Methyl isobutyl ketone | 17.50 | 7.50 | 12.50 | 12.50 |
| | Isobutyl alcohol | 55.42 | 60.42 | 57.92 | 57.92 |
| | Butyl acetate | 55.42 | 60.42 | 57.92 | 57.92 |
| | Total amounts | 233.33 | 233.33 | 233.33 | 233.33 |
| | A refractive index of a hard coat layer | 1.5872 | 1.6005 | 1.5930 | 1.5916 |
| 125 μm | Hardness | H | H | H | H |
| PET | Elongation | 40% | 40% | 40% | 40% |
| 6.5 μm coating | Interference fringes (appearance evaluation) | ○ | ○~◎ | ○ | ○ |
| | Interference fringes (transmission spectrum amplitude) | ○ | ○ | ○ | ○ |
| 100 μm | Hardness | 2B | 2B | 2B | 2B |
| PC | bending resistance | ○ | ○ | ○ | ○ |
| 5 μm coating | Interference fringes (appearance evaluation) | ◎ | ◎ | ◎ | ◎ |
| | Interference fringes (transmission spectrum amplitude) | ○ | ○ | ○ | ○ |

TABLE 4

| | COMPARATIVE EXAMPLES | |
|---|---|---|
| | F1 | F2 |
| Phenol novolac epoxy acrylate (1) | 30.00 | 30.00 |
| Phenol novolac epoxy acrylate (2) | | |
| Ethoxylated orthophenylphenol acrylate | 15.00 | 15.00 |
| Ogsol EA-0200 | 5.00 | 55.00 |
| Ogsol EA-F5503 | | |
| Pentaerythritol triacrylate | 50.00 | |
| I-184 | 5.00 | 5.00 |
| Bisphenol A ethyleneoxide-modified (2 mol) diacrylate | | |
| Acryloyl morpholine | | |
| High refractive index filler 1 (zirconia: ZRMIBK30WT %) | | |
| High refractive index filler 2 (titania: TiMIBK15WT %) | | |
| Bifunctional urethane acrylate (NV100: CN-9893) | | |

TABLE 4-continued

|  |  | COMPARATIVE EXAMPLES | |
|---|---|---|---|
|  |  | F1 | F2 |
|  | Methyl isobutyl ketone | 7.50 | 7.50 |
|  | Isobutyl alcohol | 60.42 | 60.42 |
|  | Butyl acetate | 60.42 | 60.42 |
|  | Total amounts | 233.33 | 233.33 |
|  | A refractive index of a hard coat layer | 1.5583 | 1.6002 |
| 125 μm PET | Hardness | H | B |
|  | Elongation | <15% | 40% |
| 6.5 μm coating | Interference fringes (appearance evaluation) | Δ | ○~◎ |
|  | Interference fringes (transmission spectrum amplitude) | ○ | ○ |
| 100 μm PC | Hardness | 2B | 5B |
|  | bending resistance | X | ○ |
| 5 μm coating | Interference fringes (appearance evaluation) | ○ | ○ |
|  | Interference fringes (transmission spectrum amplitude) | ○ | ○ |

In the Table 1 and Table 2, I-184 means 1-hydroxycyclohexyl phenyl ketone, a photoinitiator.

Each of the hard coat films having the hard coat layer obtained by the hard coating composition of Examples F1 to F4 had a high refractive index and excellent hardness without interference fringes. In addition, each of the obtained hard coat films of the Examples had an excellent elongation and an excellent bending resistance.

Comparative example F1 was a comparative example in which both of amounts of the component (A) and the component (C) were less than the claimed invention of the present application. In Comparative example F1, the obtained coat film had inferior elongation and bending resistance.

Comparative example F2 was a comparative example in which an amount of the component (A) was less than the claimed invention and an amount of the component (C) was more than the claimed invention. In Comparative example F2, the obtained coat film had an inferior hardness.

The experimental results of Examples and Comparative examples show that the hard coat layer according to the present invention has excellent prevention effect of an appearance of interference fringes.

Figure 3:
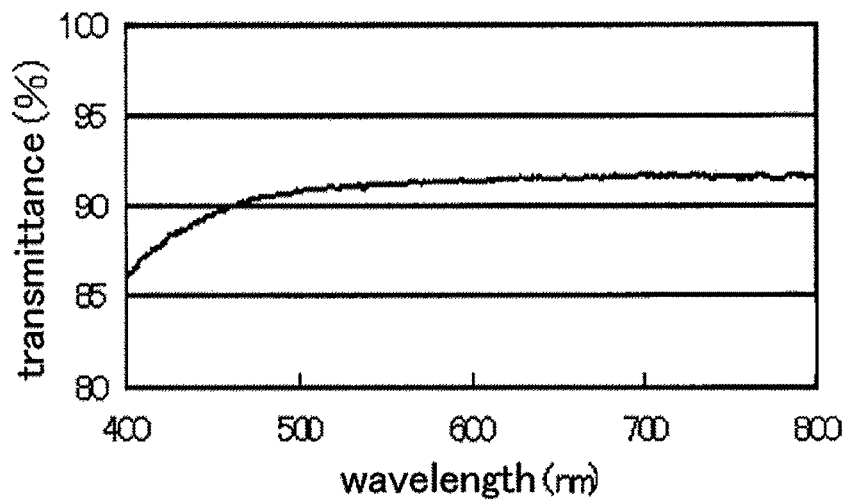
FIG. 3 is a graphical chart showing a transmission spectrum (transmittance) within a wavelength range of 400 nm to 800 nm of a hard coat layer obtained by the hard coating composition of Example F1.

FIG. 3 is a graphical chart showing a transmission spectrum (transmittance %) within a wavelength range of 400 to 800 nm of a hard coat layer obtained by the hard coating composition of Example F1. As shown in the transmission spectrum of FIG. 3, a hard coat layer obtained by the example according to the present invention has extremely narrow amplitude in the transmission spectrum. The result clearly shows that the hard coat layer has little optical blurring in visible wavelength. As shown in the transmission spectrum, technical effects of the present invention can be understandable.

Production Example 3: Production of an Unsaturated Double Bond Containing Acrylic Copolymer (1)

A mixture of 187.2 g of isobornyl methacrylate, 2.8 g of methyl methacrylate and 10.0 g of methacrylic acid was mixed. To a reaction vessel (1000 ml) equipped with a stirrer, a nitrogen gas introducing pipe, a cooling pipe and a dropping funnel charged with 360 g of propylene glycol monomethyl ether which was heated at a temperature of 110° C. under nitrogen atmosphere, the mixture was added dropwise for 3 hours, simultaneously with a dropwise addition of a solution of 800 g of propylene glycol monomethyl ether containing 2.0 g of tertiary butyl peroxy-2-ethyl hexanoate, and the resulting mixture was reacted for one hour at a temperature of 110° C.

Then, a solution of 17 g of propylene glycol monomethyl ether containing 0.2 g of tertiary butyl peroxy-2-ethyl hexanoate was added dropwise and the resulting mixture was reacted for 30 minutes at a temperature of 110° C.

To the reaction mixture, a solution of 6 g of propylene glycol monomethyl ether containing 1.5 g of tetrabutylammonium bromide and 0.1 g of hydroquinone was added, then a solution containing 24.4 g of 4-hydroxy butyl acrylate glycidyl ether and 5.0 g of propylene glycol monomethyl ether was added dropwise for one hour with air bubbling, then the resulting mixture was reacted for 5 hours.

The resulting unsaturated double bond containing acrylic copolymer had a number average molecular weight of 5500, a weight average molecular weight (Mw) of 18000. The resin had SP value of 9.7 and Tg of 92° C.

Example G1

The unsaturated double bond containing acrylic copolymer (1) obtained by Production example 3 was used as a first component. As a second component, the phenolic novolac epoxy acrylate (1) obtained by Production example 1 as a component (A) and an ethoxylated orthophenylphenol acrylate (an acrylate having 1 mol of ethylene oxide structure, a viscosity at 25° C. of 130 mPa·s, a refractive index of 1.577 and SP value of 10.6) as a component (B) were used in order to obtain a composition for forming an antiblocking layer. The raw materials shown in Table 1 were mixed in the solid amounts shown in Table 5, and were stirred to obtain a composition for forming an antiblocking layer.

The viscosity at 25° C. of the component (B), the ethoxylated orthophenylphenol acrylate, was measured by a B-type viscometer (TVB-22L, manufactured by Toki Sangyo co., ltd.) and a M1 Rotor at a number of rotations of 60 rpm after 10 ml of the component (B), the ethoxylated orthophenylphenol acrylate, was sampled in a container as a test sample and was kept under a temperature of 20° C. The refractive index of the component (B) was measured by an Abbe's refractometer in conformity with JIS (Japanese Industrial Standard) K0062.

The SP value of the second component was calculated based on SP values and amounts of each components in mass average.

The resulting composition for forming an antiblocking layer was dropped on an optical PET film (trade name KEFW, manufactured by Teijin DePont Films Japan Limited, 188 μm) and was coated with a bar coater #12. After the coating, the resulting coat was dried at 70° C. for one minute and was irradiated by ultraviolet rays of 350 mJ with a ultraviolet ray irradiator (manufactured by Fusion) to obtain an antiblocking film composed of the PET film and an antiblocking layer having a thickness of 6.5 μm.

In addition, the resulting composition for forming an antiblocking layer was dropped on an optical PC film (trade name Pureace, manufactured by Teijin Limited, 100 μm) and was coated with a bar coater #9. After the coating, the resulting coat was dried at 70° C. for one minute and was irradiated by ultraviolet rays of 350 mJ with a ultraviolet ray irradiator (manufactured by Fusion) to obtain an antiblocking film composed of the polycarbonate film and an antiblocking layer having a thickness of 5.0 µm.

Examples G2 to G5

Compositions for forming an antiblocking layer were prepared in the same manner as in Example G1 except that types and/or amounts of a component (A) were changed as shown in Table 5 and pentaerythritol triacrylate (SP value: 12.7) was used as an another (meth)acrylate in the second component. Using the resulting compositions for forming an antiblocking layer, two types of antiblocking films were prepared respectively in the same manner as in Example G1.

Comparative Examples G1 to G5, G9

Compositions for forming an antiblocking layer were prepared in the same manner as in the examples except that in accordance with the amounts as shown in Table 6. Using the resulting compositions for forming an antiblocking layer, two types of antiblocking films were prepared respectively in the same manner as in Example G1.

Comparative Examples G6, G10

Compositions for forming an antiblocking layer were prepared in the same manner as in Example G1 except that in accordance with the amounts as shown in Table 6. The resulting composition for forming an antiblocking layer was dropped on an optical PET film (trade name KEFW, manufactured by Teijin DePont Films Japan Limited, 188 µm) and was coated with a bar coater #13. After the coating, the resulting coat was dried at 70° C. for one minute and was irradiated by ultraviolet rays of 350 mJ with a ultraviolet ray irradiator (manufactured by Fusion) to obtain an antiblocking film composed of the PET film and an antiblocking layer having a thickness of 6.5 µm. In addition, the resulting composition for forming an antiblocking layer was dropped on an optical PC film (trade name Pureace, manufactured by Teijin Limited, 100 µm) and was coated with a bar coater #10. After the coating, the resulting coat was dried at 70° C. for one minute and was irradiated by ultraviolet rays of 350 mJ with a ultraviolet ray irradiator (manufactured by Fusion) to obtain a hard coat film composed of the polycarbonate film and an antiblocking layer having a thickness of 5.0 µm.

Comparative Examples G7, G11

Compositions for forming an antiblocking layer were prepared in the same manner as in Example G1 except that in accordance with the amounts as shown in Table 6. The resulting composition for forming an antiblocking layer was dropped on an optical PET film (trade name KEFW, manufactured by Teijin DePont Films Japan Limited, 188 µm) and was coated with a bar coater #16. After the coating, the resulting coat was dried at 70° C. for one minute and was irradiated by ultraviolet rays of 350 mJ with a ultraviolet ray irradiator (manufactured by Fusion) to obtain an antiblocking film composed of the PET film and an antiblocking layer having a thickness of 6.5 µm.

In addition, the resulting composition for forming an antiblocking layer was dropped on an optical PC film (trade name Pureace, manufactured by Teijin Limited, 100 µm) and was coated with a bar coater #12. After the coating, the resulting coat was dried at 70° C. for one minute and was irradiated by ultraviolet rays of 350 mJ with a ultraviolet ray irradiator (manufactured by Fusion) to obtain an antiblocking film composed of the polycarbonate film and an antiblocking layer having a thickness of 5.0 µm.

Comparative Examples G8, G12, G13

Compositions for forming an antiblocking layer were prepared in the same manner as in Example G1 except that in accordance with the amounts as shown in Table 6. The resulting composition for forming an antiblocking layer was dropped on an optical PET film (trade name KEFW, manufactured by Teijin DePont Films Japan Limited, 188 µm) and was coated with a bar coater #20. After the coating, the resulting coat was dried at 70° C. for one minute and was irradiated by ultraviolet rays of 350 mJ with an ultraviolet ray irradiator (manufactured by Fusion).

In case of the composition for forming an antiblocking layer of Comparative example G12, an antiblocking film composed of the PET film and an antiblocking layer having a thickness of 6.5 µm was obtained.

However, in case of the compositions for forming an antiblocking layer of Comparative examples G8 and G13, antiblocking films were not obtained because the coating compositions were not cured.

In addition, the resulting composition for forming an antiblocking layer was dropped on an optical PC film (trade name Pureace, manufactured by Teijin Limited, 100 µm) and was coated with a bar coater #14.

After the coating, the resulting coat was dried at 70° C. for one minute and was irradiated by ultraviolet rays of 350 mJ with an ultraviolet ray irradiator (manufactured by Fusion).

In case of the composition for forming an antiblocking layer of Comparative example G12, an antiblocking film composed of the polycarbonate film and an antiblocking layer having a thickness of 5.0 µm was obtained.

However, in case of the compositions for forming an antiblocking layer of Comparative examples G8 and G13, antiblocking films were not obtained because the coating compositions were not cured.

Example G6

On the antiblocking film obtained Example G1, an ITO layer was formed on the cured coat layer by a sputtering method in use of indium oxide-tin oxide target with a density of arrangement of 98% containing indium oxide and tin oxide with a mass ratio of 95:5, to obtain a transparent electroconductive laminate which is used as a movable electrode substrate.

A thickness of the resulting TIO layer was about 30 nm, and a surface electrical resistance after formation of the layer was about 150 Ω/sq.

From the resulting transparent electroconductive laminate, interference fringes were not visually observed.

In use of antiblocking films obtained by the above Examples G1 to G5 and Comparative examples G1 to G13, the above-mentioned tests in Example E1 were examined. In addition, a test for antiblocking (AB) property was examined as the following. Obtained test results were shown in Tables 5 and 6.

Evaluation for Antiblocking (AB) Property

An antiblocking film obtained by Example or Comparative example was cut to the size of 2 cm by 5 cm, then a coating surface of the cut sample was affixed on a PET film (without an easily adhesive layer). The resulting film was put between a pair of glass plate, and left at room temperature for 24 hours under condition of loading of 200 gf/cm². Then an occurrence of blocking (AB property) was visually evaluated based on the evaluation standard described below.
○: having antiblocking (AB) property
x: without antiblocking (AB) property

TABLE 5

| | | EXAMPLES | | | | |
|---|---|---|---|---|---|---|
| | | G1 | G2 | G3 | G4 | G5 |
| the first component | Unsaturated double bond containing acrylic copolymer(I) | 2.00 | 2.00 | 2.00 | 2.00 | 2.00 |
| the second component | Phenol novolac epoxy acrylate (1) | 85.00 | 60.00 | | 60.00 | 72.50 |
| | Phenol novolac epoxy acrylate (2) | | | 60.00 | | |
| | Ethoxylated orthophenylphenol acrylate | 15.00 | 15.00 | 15.00 | 30.00 | 22.50 |
| | Pentaerythritol triacrylate | | 25.00 | 25.00 | 10.00 | 5.00 |
| another resin component | Bisphenol A ethyleneoxide-modified (2 mol) diacrylate | | | | | |
| | Acryloyl morpholine | | | | | |
| | Bifunctional urethane acrylate (NV100: CN-9893) | | | | | |
| | I-184 | 5.00 | 5.00 | 5.00 | 5.00 | 5.00 |
| | Methyl isobutyl ketone | 21.25 | 15.00 | 15.00 | 15.00 | 18.13 |
| | Isobutyl alcohol | 53.54 | 56.67 | 56.67 | 56.67 | 55.10 |
| | Butyl acetate | 53.54 | 56.67 | 56.67 | 56.67 | 55.10 |
| High refractive index filler | High refractive index filler 1 (zirconia: ZRMIBK30WT %) | | | | | |
| | High refractive index filler 2 (titania: TiMIBK15WT %) | | | | | |
| | Total amounts | 235.33 | 235.33 | 235.33 | 235.33 | 235.33 |
| SP value | SP value of the first component | | | | | |
| | SP value of the second component | | | | | |
| | A refractive index of a hard coat layer | 1.5825 | 1.5710 | 1.5709 | 1.5813 | 1.5815 |
| 125 μm PET | Hardness | H | H~2H | H~2H | H | H |
| 6.5 μm coating | Elongation | 40% | 15% | 15% | 30% | 30% |
| | Anti-blocking property | ○ | ○ | ○ | ○ | ○ |
| | Interference fringes (appearance evaluation) | ○ | ○ | ○ | ○ | ○ |
| | Interference fringes (transmission spectrum amplitude) | ○ | ○ | ○ | ○ | ○ |
| 100 μm PC | Hardness | 2B | 2B~B | 2B~B | 2B | 2B |
| 5 μm coating | bending resistance | ○ | ○ | ○ | ○ | ○ |
| | Anti-blocking property | ○ | ○ | ○ | ○ | ○ |
| | Interference fringes (appearance evaluation) | ◎ | ◎ | ◎ | ◎ | ◎ |
| | Interference fringes (transmission spectrum amplitude) | ○ | ○ | ○ | ○ | ○ |

TABLE 6

| | | COMPARATIVE EXAMPLES | | | | | | |
|---|---|---|---|---|---|---|---|---|
| | | G1 | G2 | G3 | G4 | G5 | G6 | G7 |
| the first component | Unsaturated double bond containing acrylic copolymer(I) | 2.00 | 2.00 | 2.00 | 2.00 | 2.00 | 2.00 | 2.00 |
| the second component | Phenol novolac epoxy acrylate (1) | 95.00 | 55.00 | | 60.00 | | | |
| | Phenol novolac epoxy acrylate (2) | | | | | | | |
| | Ethoxylated orthophenylphenol acrylate | 5.00 | 45.00 | 15.00 | | | | |
| | Pentaerythritol triacrylate | | | | 25.00 | 60.00 | 40.00 | 60.00 |
| another resin component | Bisphenol A ethyleneoxide-modified (2 mol) diacrylate | | | 85.00 | | | | |
| | Acryloyl morpholine | | | | 15.00 | | | |
| | Bifunctional urethane acrylate (NV100: CN-9893) | | | | | | | |
| | I-184 | 5.00 | 5.00 | 5.00 | 5.00 | 5.00 | 5.00 | 5.00 |
| | Methyl isobutyl ketone | 23.75 | 13.75 | | 15.00 | 93.33 | 140.00 | 226.67 |
| | Isobutyl alcohol | 52.29 | 57.29 | 64.17 | 56.67 | 17.50 | 8.75 | 9.17 |
| | Butyl acetate | 52.29 | 57.29 | 64.17 | 56.67 | 17.50 | 8.75 | 9.17 |
| High refractive index filler | High refractive index filler 1 (zirconia: ZRMIBK30WT %) | | | | | 40.00 | 60.00 | |
| | High refractive index filler 2 (titania: TiMIBK15WT %) | | | | | | | 40.00 |
| | Total amounts | 235.33 | 235.33 | 235.33 | 235.33 | 235.33 | 235.33 | 235.33 |
| SP value | SP value of the first component | | | | | | | |
| | SP value of the second component | | | | | | | |
| | A refractive index of a hard coat layer | 1.5785 | 1.5910 | 1.5649 | 1.5597 | 1.5850 | 1.6263 | 1.6150 |
| 125 μm PET | Hardness | F~H | HB | B | H | 2~3H | 2~3H | H~2H |
| | Elongation | 30% | 40% | 40% | <15% | <15% | <15% | <15% |

TABLE 6-continued

| | | | | | | | | |
|---|---|---|---|---|---|---|---|---|
| 6.5 μm coating | Anti-blocking property | ○ | ○ | ○ | ○ | X | X | X |
| | Interference fringes (appearance evaluation) | ○ | ○ | X | X | X | X | X |
| | Interference fringes (transmission spectrum amplitude) | ○ | ○ | ○ | ○ | Δ | Δ | X |
| 100 μm PC 5 μm coating | Hardness | 3~2B | 4B | 5B | 2B | B | B | 2B~B |
| | bending resistance | ○ | ○ | ○ | Δ | X | X | X |
| | Anti-blocking property | ○ | ○ | ○ | ○ | X | X | X |
| | Interference fringes (appearance evaluation) | ⊚ | ⊚ | ⊚ | ○ | X | X | X |
| | Interference fringes (transmission spectrum amplitude) | ○ | ○ | ○ | ○ | Δ | X | X |

| | | COMPARATIVE EXAMPLES | | | | | |
|---|---|---|---|---|---|---|---|
| | | G8 | G9 | G10 | G11 | G12 | G13 |
| the first component | Unsaturated double bond containing acrylic copolymer(I) | 2.00 | 2.00 | 2.00 | 2.00 | 2.00 | 2.00 |
| the second component | Phenol novolac epoxy acrylate (1) | | | | | | |
| | Phenol novolac epoxy acrylate (2) | | | | | | |
| | Ethoxylated orthophenylphenol acrylate | | | | | | |
| | Pentaerythritol triacrylate | 40.00 | 40.00 | 24.00 | 16.00 | 24.00 | 16.00 |
| another resin component | Bisphenol A ethyleneoxide-modified (2 mol) diacrylate | | | | | | |
| | Acryloyl morpholine | | | | | | |
| | Bifunctional urethane acrylate (NV100: CN-9893) | | 60.00 | 36.00 | 24.00 | 36.00 | 24.00 |
| | I-184 | 5.00 | 5.00 | 5.00 | 5.00 | 5.00 | 5.00 |
| | Methyl isobutyl ketone | 340.00 | 60.00 | 129.33 | 164.00 | 262.67 | 364.00 |
| | Isobutyl alcohol | 40.00 | 34.17 | 14.08 | 40.50 | 78.67 | 28.00 |
| | Butyl acetate | 40.00 | 34.17 | 14.08 | 40.50 | 78.67 | 28.00 |
| High refractive index filler | High refractive index filler 1 (zirconia: ZRMIBK30WT %) | | | 40.00 | 60.00 | | |
| | High refractive index filler 2 (titania: TiMIBK15WT %) | 60.00 | | | | 40.00 | 60.00 |
| | Total amounts | 235.33 | 235.33 | 235.33 | 235.33 | 235.33 | 235.33 |
| SP value | SP value of the first component | | | | | | |
| | SP value of the second component | | | | | | |
| | A refractive index of a hard coat layer | — | 1.5098 | 1.5843 | 1.6261 | 1.6142 | — |
| 125 μm PET | Hardness | — | H | H~2H | H~2H | F | — |
| | Elongation | — | 20% | <15% | <15% | 20% | — |
| 6.5 μm coating | Anti-blocking property | — | ○ | X | X | X | — |
| | Interference fringes (appearance evaluation) | — | X | X | X | X | — |
| | Interference fringes (transmission spectrum amplitude) | — | X | X | X | X | — |
| 100 μm PC 5 μm coating | Hardness | — | 2B | 2B~B | 2B~B | 3B | — |
| | bending resistance | — | ○ | X | X | ○ | — |
| | Anti-blocking property | — | ○ | X | X | X | — |
| | Interference fringes (appearance evaluation) | — | X | X | X | X | — |
| | Interference fringes (transmission spectrum amplitude) | — | X | X | X | X | — |

In the Table 5 and Table 6, each term means as follows.

I-184: 1-hydroxycyclohexyl phenyl ketone, a photoinitiator.

Bisphenol A ethyleneoxide-modified (2 mol) diacrylate: Aronix M-211B manufactured by Toa gosei Co., Ltd., bisphenol A ethyleneoxide-modified (2 mol) diacrylate, SP value of 11.3.

Acryloyl morpholine: SP value of 11.9

Bifunctional urethane acrylate: NV (non-volatile component) 100, CN-9893 manufactured by Sartomer Corp., SP value of 11.1.

High refractive index filler 1: zirconia: ZRMIBK30WT %, zirconium oxide, manufactured by CIK NanoTec.

High refractive index filler 2: titania: TiMIBK15WT %, titanium oxides, manufactured by CIK NanoTec.

Each of the antiblocking films having the antiblocking layer obtained by the compositions for forming an antiblocking layer of Examples had an excellent antiblocking property, a high refractive index and excellent hardness without interference fringes. In addition, each of the obtained antiblocking films of the Examples had an excellent elongation and an excellent bending resistance.

Comparative examples G1 and G2 were a comparative example in which an amount of the component (B) was out of the claimed invention of the present application. In each of these comparative examples, the obtained coat film had a defect of inferior hardness.

Comparative example G3 was a comparative example in which bisphenol A diacrylate was used in place of the component (A). In the comparative example G3, the obtained coat film had a lower refractive index and was observed appearance of interference fringes. In addition, the obtained coat film had a defect of inferior hardness.

Comparative example G4 was a comparative example in which acryloyl morpholine was used in place of the component (B). In the comparative example G4, the obtained coat film also had a lower refractive index and was observed appearance of interference fringes. In addition, the obtained coat film had an inferior elongation.

Comparative examples G5 to G8 were comparative examples in which zirconium oxide or titanium oxides were used as a high refractive index material, in place of using the components (A) and (B). In the comparative examples, the obtained coat films had excellent hardness, however had significantly lower antiblocking property and elongation. The composition of comparative example G8 could not provide a cured coat layer.

Comparative examples G9 to G13 were comparative examples in which a bifunctional urethane acrylate was used in order to provide an elongation to an antiblocking layer. These comparative examples provided an inferior antiblocking property. Some of these comparative examples had a slightly-increased elongation. However, performance balancing of a hardness and a refractive index was deteriorated in these comparative examples. The composition of comparative example G13 could not provide a cured coat layer.

The compositions for forming an antiblocking layer of Comparative examples G5 to G13 included high refractive index fillers. Including high refractive index fillers provided indeed a high refractive index of the obtaining antiblocking layer. On the other hand, each the obtaining antiblocking layer of the comparative examples was observed appearance of interference fringes. The reason why the comparative examples had appearance of interference fringes seems to be a mixture of resin components having lower refractive indexes which form an antiblocking layer and high refractive index fillers which exist between the resin components. The constitution seems to provide inferior prevention of appearance of interference fringes because of a bad influence of the resin components' lower refractive indexes, even if a refractive index itself of an antiblocking layer is high.

INDUSTRIAL APPLICABILITY

A transparent hard coat layer obtained by the hard coating composition according to the present invention has high visibility and stretchability, as well as excellent hardness. The transparent hard coat layer which is formed by the hard coating composition according to the present invention has a technical characteristic of high refractive index. Therefore, the present invention has advantageousness of an excellent stretchability without interference fringes in case that the transparent hard coat layer according to the present invention is applied onto a high refractive index substrate film such as a PET film or a polycarbonate film.

An antiblocking layer obtained from the composition for forming an antiblocking layer according to the present invention has a technical feature of excellent hardness, high visibility and an excellent stretchability, as well as an excellent antiblocking property. The antiblocking layer obtained from the composition for forming an antiblocking layer according to the present invention also has a technical characteristic of high refractive index. Therefore, the present invention has advantageousness without interference fringes in case that the antiblocking layer according to the present invention is applied onto a high refractive index substrate film such as a PET film or a polycarbonate film.

What is claimed is:
1. A hard coating composition comprising:
(A) a phenolic novolac acrylate having two or more acrylate groups, and

(B) an aromatic group-containing mono or poly (meth)acrylate having 1 or 2 mols of an alkylene oxide structure with two or three carbon atoms in each molecule,
wherein the hard coating composition comprises 60 to 85 parts by mass of the phenolic novolac acrylate (A) and 15 to 30 parts by mass of the (meth)acrylate (B), to provide 100 parts by mass of a resin content in the hard coating composition.

2. The hard coating composition according to claim 1, wherein the phenolic novolac acrylate (A) is represented by the following formula (I):

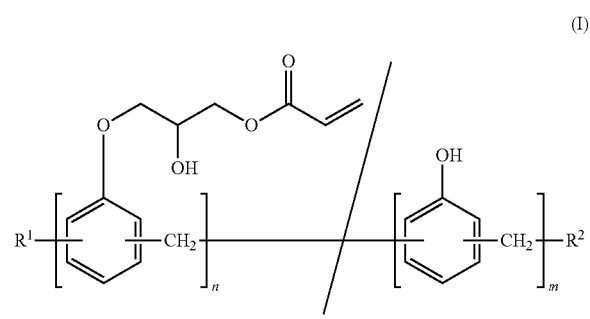

wherein $R^1$ represents H or $CH_2OH$, $R^2$ represents H or OH, n represents a number of 2 to 5 and m represents a number of 0 to 5.

3. The hard coating composition according to claim 1, wherein the (meth)acrylate (B) is an aromatic group-containing (meth)acrylate having a refractive index within a range of 1.56 to 1.64.

4. The hard coating composition according to claim 1, further comprising (C) a fluorene unit-containing (meth)acrylate having two or more (meth)acrylate groups, wherein the hard coating composition comprises 60 to 70 parts by mass of the phenolic novolac acrylate (A), 15 to 30 parts by mass of the (meth)acrylate (B) and 15 to 25 parts by mass of the fluorene unit-containing (meth)acrylate (C) to provide 100 parts by mass of the resin content in the hard coating composition.

5. The hard coating composition according to claim 4, wherein the fluorene unit-containing (meth)acrylate (C) is represented by the following formula (II):

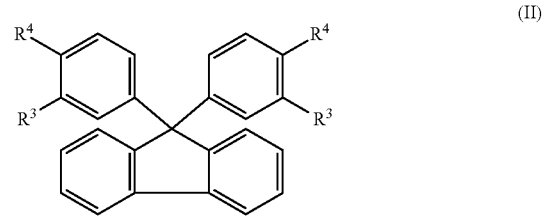

wherein each of $R^3$ independently represents H or $CH_3$, $R^4$ represents -A-OC(O)CR=$CH_2$, wherein A each represents —$OCH_2CH_2$—, —$OCH_2CH_2CH_2$—, —$OCH(CH_3)CH_2$— or —$OCH_2CH(CH_3)$— and R each represents H or $CH_3$.

6. The hard coating composition according to claim 1, wherein a total content of ZnO, $TiO_2$, $CeO_2$, $SnO_2$, $ZrO_2$ and indium tin oxide in the hard coating composition is less than or equal to 0.0001% by mass.

7. A hard coat film comprising a transparent polymer substrate and a hard coat layer which is obtainable by applying the hard coating composition according to claim 1 on the substrate, wherein the hard coat layer has a refractive index within a range of 1.565 to 1.620.

8. The hard coat film according to claim 7, wherein the hard coat layer has a thickness within a range of 0.05 to 10 μm.

9. The hard coat film according to claim 7, wherein
the substrate is a PET film having a thickness within a range of 20 to 300 μm, and
the hard coat film has a characteristic that the hard coat layer has no crack in case that the hard coat film is elongated by 15% in a machine direction at a tension rate of 5 mm/second at 20° C.

10. The hard coat film according to claim 7, wherein
the substrate is a polycarbonate film having a thickness within a range of 30 to 200 μm, and
the hard coat film has a characteristic that both of the hard coat layer and the substrate have no crack in case that the hard coat film is bent at a 180 degree-angle under a condition of 25° C. and 60 degree/second.

11. A transparent electroconductive laminate comprising the hard coat film according to claim 7 and a transparent electrically conducting layer formed on at least one surface of the hard coat film.

12. The transparent electroconductive laminate according to claim 11, wherein
the transparent electrically conducting layer is a crystalline layer comprising indium oxide, and
the transparent electrically conducting layer has a thickness within a range of 5 to 50 nm.

13. The transparent electroconductive laminate according to claim 11, wherein the transparent electroconductive laminate has a metal oxide layer between the hard coat layer and the transparent electrically conducting layer, and the metal oxide layer has a thickness within a range of 0.5 to 5.0 nm.

14. A touch panel comprising the transparent electroconductive laminate according to claim 11.

15. A composition for forming a high refractive index antiblocking layer comprising a first component and a second component, wherein
the high refractive index is within a range of 1.565 to 1.620,
the first component is an unsaturated double bond containing acrylic copolymer, and
the second component comprises:
(A) a phenolic novolac acrylate having two or more acrylate groups, and
(B) an aromatic group-containing mono or poly (meth) acrylate having 1 or 2 mols of an alkylene oxide structure with two or three carbon atoms in each molecule, wherein
the second component comprises 60 to 85 parts by mass of the phenolic novolac acrylate (A) and 15 to 30 parts by mass of the (meth)acrylate (B) to provide 100 parts by mass of the second component,
a difference of solubility parameter values (ΔSP) of the first component (SP1) and the second component (SP2) is within a range of 1 to 4,
a mass ratio of the first component to the second component in the composition is from 0.5:99.5 to 20:80, and
phase separation occurs between the first component and the second component after the composition for forming the high refractive index antiblocking layer is applied, to form an antiblocking layer having a microscopic convexoconcave on its surface.

16. The composition for forming a high refractive index antiblocking layer according to claim 15, wherein the phenolic novolac acrylate (A) is represented by the following formula (I):

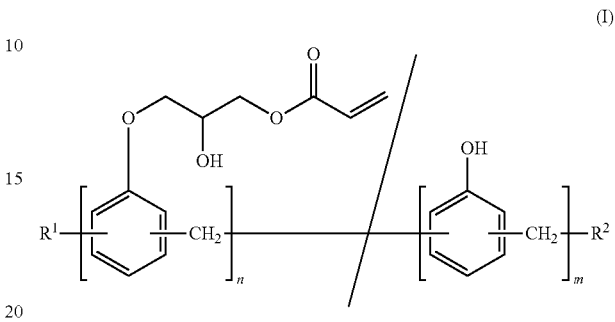

wherein $R^1$ represents H or $CH_2OH$, $R^2$ represents H or OH, n represents a number of 2 to 5 and m represents a number of 0 to 5.

17. The composition for forming a high refractive index antiblocking layer according to claim 15, wherein the (meth) acrylate (B) is an aromatic group-containing (meth)acrylate having a refractive index within a range of 1.56 to 1.64.

18. The composition for forming a high refractive index antiblocking layer according to claim 15, wherein a total content of ZnO, $TiO_2$, $CeO_2$, $SnO_2$, $ZrO_2$ and indium tin oxide in the composition is less than or equal to 0.0001% by mass.

19. An antiblocking film comprising a transparent polymer substrate and an antiblocking layer which is obtainable by applying the composition according to claim 15 on the substrate, wherein
the antiblocking layer has a refractive index within a range of 1.565 to 1.620, and
the antiblocking layer has an arithmetic average roughness (Ra) of 0.001 to 0.09 μm and a ten-point average roughness (Rz) of 0.01 to 0.5 μm.

20. The antiblocking film according to claim 19, wherein the antiblocking layer has a thickness within a range of 0.05 to 10 μm.

21. The antiblocking film according to claim 19, wherein
the substrate is a PET film having a thickness within a range of 20 to 300 μm, and
the antiblocking film has a characteristic that the antiblocking layer has no crack in case that the antiblocking film is elongated by 15% in a machine direction at a tension rate of 5 m/minute at 20° C.

22. The antiblocking film according to claim 19, wherein
the substrate is a polycarbonate film having a thickness within a range of 30 to 200 μm, and
the antiblocking film has a characteristic that both of the antiblocking layer and the substrate have no crack in case that the antiblocking film is bent at a 180 degree-angle under a condition of 25° C. and 60 degree/second.

23. The antiblocking film according to claim 19, wherein the antiblocking film has a total light transmittance of not less than 88% and a haze value of not greater than 2%.

24. A transparent electroconductive laminate having the antiblocking film according to claim 19 and a transparent electrically conducting layer formed on at least one surface of the antiblocking film.

25. The transparent electroconductive laminate according to claim 24, wherein
the transparent electrically conducting layer is a crystalline layer comprising indium oxide, and
the transparent electrically conducting layer has a thickness within a range of 5 to 50 nm.

26. The transparent electroconductive laminate according to claim 24, wherein
the transparent electroconductive laminate has a metal oxide layer between the antiblocking layer and the transparent electrically conducting layer, and
the metal oxide layer has a thickness within a range of 0.5 to 5.0 nm.

27. A touch panel comprising the transparent electroconductive laminate according to claim 24.

* * * * *